(12) United States Patent
Sajkowsky

(10) Patent No.: US 7,176,800 B2
(45) Date of Patent: Feb. 13, 2007

(54) ELECTRONIC SECURITY SYSTEM FOR MONITORING AND RECORDING ACTIVITY AND DATA RELATING TO PERSONS OR CARGO

(75) Inventor: James M. Sajkowsky, Pennington, NJ (US)

(73) Assignee: United Security Applications ID, Inc., East Windsor, NJ (US)

( * ) Notice: Subject to any disclaimer, the term of this patent is extended or adjusted under 35 U.S.C. 154(b) by 0 days.

(21) Appl. No.: 11/303,334

(22) Filed: Dec. 15, 2005

(65) Prior Publication Data

US 2007/0008135 A1    Jan. 11, 2007

Related U.S. Application Data

(63) Continuation-in-part of application No. 10/871,263, filed on Jun. 17, 2004, now Pat. No. 7,012,529.

(60) Provisional application No. 60/479,127, filed on Jun. 17, 2003.

(51) Int. Cl.
*G08B 13/14* (2006.01)

(52) U.S. Cl. .............................. 340/572.1; 340/539.1; 705/1

(58) Field of Classification Search ............. 340/572.1, 340/539.1, 825.49, 573.4, 5.6; 705/1
See application file for complete search history.

(56) References Cited

U.S. PATENT DOCUMENTS

| | | | |
|---|---|---|---|
| 6,657,543 B1 * | 12/2003 | Chung | 340/573.1 |
| 6,698,653 B1 | 3/2004 | Diamond et al. | |
| 6,779,721 B2 | 8/2004 | Larson et al. | |
| 6,853,739 B2 | 2/2005 | Kyle | |
| 6,867,683 B2 | 3/2005 | Calvesio et al. | |
| 2002/0069084 A1 * | 6/2002 | Donovan | 705/1 |
| 2003/0058082 A1 * | 3/2003 | Mallick et al. | 340/5.6 |
| 2006/0006999 A1 * | 1/2006 | Walczyk et al. | 340/539.27 |
| 2006/0055552 A1 * | 3/2006 | Chung et al. | 340/686.1 |

* cited by examiner

*Primary Examiner*—Phung T. Nguyen
(74) *Attorney, Agent, or Firm*—McCormick, Paulding & Huber LLP

(57) ABSTRACT

A security system and method for the limited monitoring of visitors to a country or territory has an input component such as a keyboard or electronic reader configured for receiving information pertaining to a visitor's stay in a country or territory. The information includes the scheduled departure of the visitor. A controller communicates with the input component, and a database communicates with the controller for storing the information pertaining to the visitor's stay. The controller is configured for polling the database to determine if the visitor has departed as scheduled, and for sending an alert if the visitor has not left as scheduled.

15 Claims, 17 Drawing Sheets

ELECTRONIC SECURITY SYSTEM FOR MONITORING AND RECORDING ACTIVITY AND DATA RELATING TO PERSONS OR CARGO

CROSS-REFERENCE TO RELATED APPLICATIONS

This application is a continuation-in-part of U.S. application Ser. No. 10/871,263, filed on Jun. 17, 2004 now U.S. Pat. No. 7,012,529, which claims the benefit of U.S. Provisional Application No. 60/479,127, filed on Jun. 17, 2003, both entitled "Electronic Security System For Monitoring and Recording Activity and Data Relating to Persons and Goods"; and further relates to co-pending U.S. application Ser. No. 10/871,267, filed on Jun. 17, 2004, entitled "Electronic Security System For Monitoring and Recording Activity and Data Relating to Persons"; and further relates to co-pending U.S. application Ser. No. 10/871,264, filed on Jun. 17, 2004, entitled "Electronic Security System For Monitoring and Recording Activity and Data Relating to Institutions and Clients Thereof", the disclosures of all of the aforementioned applications being hereby incorporated by reference in their entireties.

TECHNICAL FIELD

The present invention relates to systems and methods of monitoring and recording data and activity with respect to goods and, more particularly, to a system that monitors and records dynamic real time data related to the containment of goods or the departure or arrival of persons in a foreign country or territory, with particular application to goods or persons in transit in the context of providing security.

BACKGROUND OF THE INVENTION

The need for more secure methods of shipping goods in the United States became apparent after the large scale national security breach on Sep. 11, 2001. At that time, United States Customs and others responsible for monitoring the shipment of goods into the United States relied primarily on printed documentation and visual inspection of the cargo itself. Systems for tracking cargo as it traveled were essentially non-existent. Nor was there any way of providing the capability of inspecting the contents of a shipping container without opening the container up and taking the risk that the cargo could be dangerous. Developments that have occurred after Sep. 11, 2001, include changing from paper to electronic booking and manifests, using gamma- and x-ray scanners to examine the contents of containers without opening them, and creating portals on which authorized users can track shipping information. Even with these new developments, inspectors are still unable to tell what is in a container without making a visual inspection of the container. Furthermore, inspectors are still unable to track the contents of shipments during transit without intrusive inspection.

It is generally known that identification machines and information storage and processing machines in electronic form for storing, processing, and transmitting data with respect to specific accounts are used in many contexts with regard to the regulation of commerce and business. Such machines include, for example, portable microprocessor devices including computers, "smartcards" with microchips, electronically scanned labels or bar codes, light and radio sensors, and other known technologies. Using these types of devices, various data can be input manually or automatically through various input and scanning mechanisms.

Typically, such devices that store, process, and transmit data are linked, in any one of a variety of technologically known ways, to a computer-based network that communicates with input and output devices to store and process data. For example, such networks include the Internet or the World Wide Web, or private networks. Transmission of data is achieved via modem, cable, radio frequency (RF) transmission, or the like.

While there are many known applications for obtaining, storing, processing, and communicating data using the known hardware and software technologies available, no such systems or configurations exist for obtaining, managing, processing, and communicating sufficient data in a manner that effectively monitors and tracks goods traveling into and out of one or more countries. Furthermore, there lacks known means to effectively link such information in real time among numerous countries and authorities in a cooperative and useful manner.

Currently, U.S. Customs thoroughly screens and examines all of the shipments that are deemed to potentially pose a risk to the security of the United States. The goal of U.S. Customs is to screen these shipments before they depart for the United States whenever possible. To do so, Customs receives electronic bill of lading/manifest data for approximately 98 percent of the sea containers before they arrive at U.S. seaports. Customs uses this data to first identify the lowest risk cargo being shipped by long-established and trusted importers. In the year 2000, nearly half a million individuals and companies imported products into the United States. But 1,000 companies (the top two tenths of one percent) accounted for 62 percent of the value of all imports. Some shipments for these companies are still randomly inspected, but the vast majority is released without physical inspection.

The U.S. Customs and Border Protection (CBP) Modernization Effort, which encompasses the Automated Commercial Environment (ACE) and the International Trade Data System (ITDS) programs which focus on cargo import and export operations, began in 2001. The ACE and ITDS formed the basis for a system that provided a "single screen" for the international business community to interact with CBP and all government agencies on import/export requirements. The CBP technology foundation, also referred to as the Enterprise Architecture, is established to support all field activities and align information technology with the strategic objectives of CBP and all agencies.

The CBP Modernization Program redesigns the automated systems that support CBP operations for all goods and people crossing U.S. borders. CBP recognizes that the business community requires the ability to transmit and receive electronic information in coordination with all the necessary government agencies in order to process imports, exports, and passenger movement, and comply with all the laws and regulations governing goods and people crossing our borders. Accordingly, CBP supports both government agencies with border-related missions as well as any business communities whose focus it is to move goods and people across U.S. borders.

The ACE lays the technology foundation for the CBP and delivers enhanced support of the cargo processing and enforcement operations from beginning to end. All related functions for CBP, the trade community, and government agencies are supported from a single common user interface, a single screen for officers to perform their work. Additionally, CBP continues to support the traditional system-to-system interfaces. Both imports and exports are linked seamlessly to enforcement, revenue management, and mission support systems to enable integrated field operations and nationwide collaborative teaming among officers within CBP, across agency lines, and between government and the business community.

The ACE provides for a Secure Data Portal that is similar to commonly used Internet sites like AOL and Yahoo that offer a broad array of services and features such as search engines and on-line tools. The ACE Secure Data Portal provides a universal dashboard for data, tools, and information—a worktool that can be customized by each particular user. Although the Portal is a powerful tool to access information and conduct business, ACE also continues to provide the traditional system-to-system interfaces with the business community.

The Portal allows users "point and click" access to applications and information sources and permits collaboration within CBP and among CBP, the trade, and government agencies. Users log in to a customized screen that functions as a starting point for ACE and the applications and systems that the user regularly uses (current and new systems).

Strict security is in place to ensure that users are only authorized to access data deemed appropriate for their role. The user-friendly design of the ACE Secure Data Portal simplifies access, analysis, and movement of all cargo and passenger information. Currently, a CBP officer retrieves and analyzes information in different systems, including Automated Commercial System (ACS), Automated Export System (AES), Treasury Enforcement Communications System (TECS), and targeting. Furthermore, the Portal allows access to all of these integrated systems with a single sign on.

The information that CBP officers are able to view on their screens depends on the role and work location specific to each user. Similarly, the business community and government agency officials only have access to the information they are authorized to view. Security and access controls are a prerequisite. This provides the user with automatic access to specific information needed to perform his/her duties without having to search for it on different systems.

Through a single, user-friendly computer screen, users with the requisite authorization have access to information pertaining to transaction data for importers, exporters, carriers, shippers, etc.; enforcement and targeting systems, including TECS; analytical and data mining tools to search the ACE data warehouse; Office of Regulations & Rulings (OR&R) rulings and information; multi-agency information databases; and information sources on the CBP network and the Internet. CBP officers are able to collaborate with each other on-line nationwide while reviewing the same or related information on their screens. Officers from different regulatory or law enforcement agencies can thus exchange data easily. CBP and its counterparts in the business community operate through the ACE Secure Data Portal to resolve issues or discrepancies without the exchange of phone calls or paper.

Using ACE, CBP Inspectors and other relevant government officers are able to make decisions for processing imports. This does not mean pre-clearance, but it does translate into the receiving of advance information on shipments, pre-arrival risk assessment, intelligence analysis, and staged enforcement.

Instead of having several different unrelated "stove-piped" cargo release systems, inspectors have one consolidated release system in the primary inspection booth that provides instant access to all necessary data. The ACE powers an expedited release process for carriers and shippers that have pre-filed, been pre-approved, and been subject to enforcement prescreening and targeting. An integrated risk management and targeting system (integrated across CBP and ITDS agencies) implements all types of enforcement and selectivity screening for commercial shipments. The CBP laboratories are also linked so that lab personnel may report and retrieve lab findings, allowing other personnel to review them immediately. These functions provide comprehensive information support for managing the consistency and effectiveness of port operations.

Through ACE, importers are encouraged to file electronically well in advance of a shipment's arrival at a border. CBP and all participating government agencies then process and analyze this information, and determine whether to accept the entry and speed it on its way, or to examine it, refuse it, or seize it.

Early releases of ACE functionality allow the Federal Motor Carrier Safety Administration and the Immigration and Naturalization Service to validate the conveyance, driver, and crew. In subsequent releases of ACE functionality, the ITDS "screen" of ACE is expanded from border admissibility agencies to enforcement, regulatory, licensing, and statistical agencies. The ACE provides the authorized user with the ability to maintain, track, and access all types of reference information for clearance decisions. These include licenses, permits, and certificates for all types of accounts; results of all inspector examinations; a tracking system for compliance violations and courses of action for commercial and enforcement interventions; foreign visas and quotas; and intellectual property rights (IPR) such as registered trademarks and copyrights.

The ACE also provides both CBP and the business community with the tools and the technology necessary to ensure secure supply-chain management. This includes tools that provide for the advanced manifesting systems for truck, ocean, rail, and air; tracking of intermodal shipment movements and cargo moving in transit (e.g., in-bond, warehouse, Foreign Trade Zone); and enhanced conveyance and transit cargo tracking for shipments from origin to destination, regardless of transportation modes. Finally, when exports are processed in ACE, CBP will have a complete end-to-end record of cross-border processing and international supply chain information.

Ultimately, ACE provides tools to measure and evaluate the effectiveness of selectivity criteria, including tools for data validation, admissibility, entry, manifest, and release processing. These functions, coupled with account management, support enhanced compliance program activities, evaluations, and the development of improved processes.

The ACE is not simply a system for commercial processing. It provides the capability to access data in the international supply chain needed by CBP and other agencies to anticipate, identify, track, and intercept high-risk shipments. It is also capable of providing an electronic truck manifest system, thereby filling a void in current enforcement capabilities. Through ACE, CBP officers retrieve advance data on shipments crossing Canadian and Mexican borders for use in prescreening and advanced targeting. Existing enforcement data, coupled with carrier and driver registration systems and expanded manifest data, provide a consolidated view of shipment risk in near-real-time at the primary inspection booth.

As a knowledge-based tool, ACE links people, data, and tools through a targeting system that permits the government to leverage trade information and collaborate with other government agencies to detect and respond to threats; to develop and utilize intelligence; and to conduct investigations. The goal is to get the right information, to the right people, at the right time and place, and take the appropriate action.

Enforcement and compliance selectivity criteria from CBP and ITDS agencies screen every ACE import and export transaction. Tools are used to create, validate, and maintain selectivity criteria; to manage usage; and to measure performance. The system tracks examination and enforcement results and distributes them immediately to authorized users. It extends targeting to cover the vast majority of the cargo and conveyances entering the country. CBP also considers the adoption of enforcement, intelligence, and analytical applications used by other law enforcement and intelligence agencies. Where appropriate, they are modified to support CBP programs and integrated with ACE and the ACE Secure Data Portal.

One of the critical challenges facing Homeland Security is the secure sharing of enforcement and intelligence information through a common data warehouse with analytical and intelligence tools that will access real-time data, on goods and people in advance of arrival.

The technology foundation that underlies ACE supports the border passenger and enforcement systems for CBP. The ACE also facilitates information sharing within CBP and with other agencies and provides a secure channel for officers to communicate over the ACE Secure Data Portal. This supports the work of officers stationed overseas on the Container Security Initiative (CSI) and the exchange of information globally between law enforcement agencies and international companies operating under the Customs-Trade Partnership Against Terrorism (C-TPAT). Furthermore, the switch from paper records to electronic ones for goods being exported allows for the near real-time exchange of information. In particular, a program known as the Automated Export System (AES) Vessel Transportation Module allows Customs to match commodity data transmitted by the exporter or his agent with the booking and manifest data transmitted by the carrier.

Both AES and the Automated Targeting System-Antiterrorism (ATS-AT) use the AES database to focus on high-risk export shipments. Up-front edits in AES helps to ensure the data meet export-reporting requirements and reduces delays caused when information is inaccurate or incomplete. By receiving the data electronically early in the export process, Customs can target, schedule, and complete verification examinations far enough in advance that most shipments can make their scheduled sailing. Transmitting this information directly to Customs is faster and more efficient than printing requested booking reports and producing reams of paper manifest. Electronic transmissions reduce costs associated with printing, courier deliveries to the port of export, and storage of paper manifests.

Vessel carriers participating in the Vessel Transportation Module transmit the following four electronic messages to AES: 1) A booking message. Either on a flow basis or in batches, the carrier may transmit bookings to AES as far in advance of export as the carrier elects, but all available bookings are transmitted 72 hours prior to departure. All bookings received by the carrier after the 72-hour mark are transmitted to AES when received. The "Booking Message" includes information on the customer/shipper, cargo, and destination. 2) A receipt of booking message. Upon the carrier's receipt of the first piece of booked cargo, the carrier transmits a "Receipt of Booking Message" to AES. If Customs determines that a verification examination is required, Customs immediately returns a "Hold Message" to the carrier. If the carrier does not receive a "Hold Message," the cargo may be loaded on the vessel. When Customs has completed a required examination and determined that the cargo may be exported, a "Release Message" is transmitted to the carrier. 3) A departure message. The carrier transmits the "Departure Message" no later than the first calendar day following the actual departure of the vessel. This message notifies Customs that the vessel has departed. 4) A manifest message. Within ten calendar days after departure from each port, the carrier transmits the entire manifest electronically. This is a change from the present four-day filing requirement for paper manifests, which remains the same. All paper Shippers Export Declaration (SED) are delivered to the port of export within four days after the date of departure.

CBP also automates the issuance of In-Bond numbers to the trade community and issues the numbers more directly from the port personnel. Such protocol is an advancement over previous methods, which typically encompassed issuing numbers manually by Headquarters, Office of Field Operations, Trade Programs.

Further, CBP expanded enforcement of the 24-hour rule. The 24-hour rule requires an advance cargo declaration from sea carriers and became effective on Dec. 2, 2002. CBP uses the cargo information to identify and eliminate potential terrorist threats before a vessel sails from a foreign port to U.S. seaports, rather than after a vessel and its cargo arrives in the United States. CBP now issues "Do Not Load" messages for containerized cargo that has an invalid or incomplete cargo description. Initially, enforcement efforts focused only on significant violations of the cargo description requirements of the 24-hour rule. For example, the use of such vague cargo descriptions a "Freight-All-Kinds," "Said-To-Contain," or "General Merchandise" was not tolerated. CBP now issues monetary penalties for late submission of cargo declarations. CBP now issues "Do Not Load" messages for clear violations of the consignee name and address requirement. For example, consignee fields left blank, or the use of "To Order" and "To Order of Shipper" without corresponding information in the consignee field and notify party field, or consignee name with no address, incomplete address or invalid address are not acceptable. CBP now issues monetary penalties for Foreign Remaining on Board (FROB) cargo that has an invalid cargo description, and has been loaded onboard the vessel without providing CBP a 24-hour time frame for targeting.

Another advancement is the Container Security Initiative (CSI). Started by the Customs Service in early 2002, CSI puts teams of Customs professionals in ports around the world to target containers that may pose a risk for terrorism. Al Qaeda has stated that one of its goals is to destroy U.S. economic interests. Containerized shipping is a major vulnerability, and the global economy depends upon it. Over 200 million cargo containers move between major seaports each year. To eliminate these risks, CSI lays out goals including: intensifying targeting and screening of containers at ports worldwide, before those containers are loaded and sent to their final destinations; including national security factors in targeting; providing additional outreach to US industry for cooperation, idea generation, and data collection; establishing security criteria for identifying containers that may pose a risk for terrorism, based on advance information; pre-screening containers at the earliest possible point using technology to quickly pre-screen containers that may pose a risk for terrorism; developing secure and "smart" containers; significantly increasing ability to intercept containers that may pose a risk for terrorism, before they reach US shores; increasing the security of the global trading system; facilitating smooth movement of legitimate trade; protecting port infrastructures; enhancing safety and security for all; giving a competitive advantage to the trade; international reciprocity; insurance; deterrence.

The top 20 ports in the world which handle approximately 70% of containers destined for the U.S. are now participating in CSI. U.S. Customs and Border Protection (CBP) CSI teams work in the foreign country with the host government to identify and target high-risk containers for pre-screening. The host government then conducts the inspection while the US CSI team observes. Low-risk and CSI pre-screened containers enter without additional delay unless more information dictates otherwise. CSI both increases security and facilitates flow of legitimate trade. CSI partners with CBP to develop the best CSI enforcement and facilitation practices. Cooperative targeting with foreign partners results in better information which improves targeting decisions, fewer containers being identified as high-risk for better facilitation, and the high-risk determination is now based on more complete information for enhanced security. Specific successes include important seizures at several CSI ports.

While the methods and systems described above address the problems associated with the transmission of data pertaining to cargo shipments, they fail to provide the ability to monitor the shipments, control their accessibility, and detect security breaches therein. They further do not support a system that allows for the tracking of cargo in transit, the monitoring of the cargo to ascertain the integrity of the cargo containers during the transit, and to verify container contents without intrusive verification. The CBP system, in particular, allows CBP officers to collaborate on-line while reviewing related information. It further allows for the receiving of advance information, early risk assessment and analysis, and staged enforcement. The use of the ACE Secure Data Portal merely simplifies the access and analysis of the information. CSI, on the other hand, targets and screens cargo containers before those containers are loaded and shipped to the U.S. Data is collected and security measures are implemented based on advance information. In both the CBP system and the CSI system, once data is collected, an inspection must be carried out using a specified procedure at a specified point. Any alteration of the goods being inspected must be visually ascertained, and any breach of security that does not result in an obvious compromise of the integrity of the cargo would likely go undetected. More specifically, the addition of a discretely packaged hazardous or dangerous material to a cargo container containing a product such as lawn tractors, furniture, televisions, or the like would not be noticed short of physically inspecting any sealing apparatus that is used to seal the container and making a determination that the integrity of the container has been compromised.

What is needed is a system that allows for the monitoring of shipments, the control of their accessibility, and the detection of security breaches while allowing the exchange of information between authorized users of the system. What is also needed is a system that allows for the monitoring of the actual contents of shipments during the transit thereof.

Moreover, in view of national security, there is not only a need for the monitoring of shipment of goods, but also a need for the limited and generally non-intrusive monitoring of noncitizen visitors to, for example, a foreign country to ensure that the visitors do not abuse their stay to the detriment of the host country. Specifically, there is a need to ensure that noncitizen visitors do not significantly deviate from their itinerary and that such visitors leave the country according to their schedule.

SUMMARY OF THE PRESENT INVENTION

In one aspect, the present invention is directed to a tracking system for use in identifying contents of a container, the container having an associated data set indicative of the container contents and parameters thereof. Such a system includes an electromagnetic identification apparatus attached to the container for providing an electromagnetic signal indicative of the container content data set; a writer for use in encoding the electromagnetic signal indicative of the container content data set onto the electromagnetic identification apparatus; a controller for receiving the encoded signal corresponding to the container content data set and for storing the encoded signal in a master database storage apparatus; and a reader configured outside the container for communicating with the electromagnetic identification apparatus and for receiving the encoded signal therefrom and corresponding to the container content data signal set. The reader also provides the controller with signals indicative of the container content data signal set.

In another aspect, the present invention is directed to a system for tracking items in an assembly, the assembly including a plurality of individual items, each item having an electromagnetic identification tag encoded with information specific to that item, with each identification tag capable of providing electromagnetic signals indicative of the encoded item information. The system includes an apparatus for receiving the electromagnetic identification tag signals; an apparatus for creating from the received electromagnetic identification tag signals for creating a first tier aggregate signature corresponding to signals indicative of a select set of electromagnetic identification tags in the assembly; an apparatus for storing the first tier aggregate signature signals in a master database; and an apparatus for receiving modifying command signals for creating a second tier aggregate signature signal corresponding to a modified set of electromagnetic identification tags in an augmented assembly.

In another aspect, the present invention is directed to a system for managing items in a collection, the collection including a plurality of received goods marked with electromagnetic identification tags having encoded information, each tag being capable of providing electromagnetic signals indicative of the encoded information. Such a system includes an apparatus for receiving electromagnetic signals from electromagnetic identification tags; an apparatus for creating a first aggregate signature corresponding to the electromagnetic signals from the electromagnetic identification tags; an apparatus for notifying a consignee of the goods of the arrival of the goods; an apparatus for creating a second aggregate signature corresponding to the electromagnetic signals from the electromagnetic identification tags; an apparatus for comparing the first aggregate signature to the second aggregate signature to determine any discrepancies between the first and second aggregate signatures; and an apparatus for transferring information indicative of the comparison of the first and second aggregate signatures to a database maintained by the consignee.

In yet another aspect, the present invention is directed to a method for managing items in a collection, the items being goods marked with electromagnetic identification tags having encoded information, each tag being capable of providing electromagnetic signals indicative of the encoded information. Such a method includes the steps of receiving goods marked with electromagnetic identification tags into the collection; notifying a third party consignee of the receipt of the goods; transferring the goods to the third party consignee; comparing the goods as received into the collection to the goods as received by the third party consignee to determine if a discrepancy exists; and transferring information indicative of the comparison to an inventory database.

The present invention system uses identification and information storage means, communications means, processing means and other technologies to carry out its design. The system involves the placement of radio frequency (RF) technology tags on goods in their place of manufacture. Before transit, the information stored on the tags on each good or item being shipped is read with an RF scanner, logged on a computer, and sent via the Internet to a centralized database to form a complete list of the items or goods contained in a shipment. Shipping containers are sealed with another RF tag which stores the list of the contents on the container and indicates if the container seal had been tampered with. The system also uses appropriate RF scanners and mobile computers to scan through shipping containers during or at the end of transit to check if the goods have changed or been tampered with by comparing with the information in the database. This system allows real time inspections of goods being shipped at any point along the shipping route and enables questionable or altered shipments to be targeted and removed.

In another aspect, the present invention is directed to a security system for the limited monitoring of visitors to a country or territory. The system comprises at least one input component such as, for example, a keyboard or electronic reader configured for receiving information pertaining to a visitor's stay in a country or territory. The information includes the scheduled departure of the visitor. At least one controller communicates with the input component. At least one database communicates with the controller for storing the information pertaining to the visitor's stay. The controller is configured for polling the database to determine if the visitor has departed as scheduled, and preferably for sending an alert if the visitor has not left as scheduled.

In another aspect, the present invention relates to a method for the limited monitoring of visitors to a country or territory. The method comprises inputting into a database information pertaining to a visitor's stay including the scheduled departure of the visitor. The database is polled for information pertaining to actual departure of the visitor. The information pertaining to actual departure is compared with the information pertaining to scheduled departure to determine if the visitor departed as scheduled. An alert preferably is generated if the visitor did not depart as scheduled.

DETAILED DESCRIPTION OF THE PREFERRED EMBODIMENT

By way of introduction, radio frequency identification (RFID) is used in certain applications to supplement bar codes for the identification of goods in commerce (hereinafter "goods"). RFID technology utilizes two-way RF transmission. A system based on RF and used to provide identification capabilities typically consists of an apparatus that operates as a tag, the tag being or having a microchip with an antenna that has the ability to store information which identifies the product individually. A reader then sends signals to the tag to interrogate the tag. The tag returns a signal back to the reader with requested information. A controller is used to process the information (e.g., compare it to known information), and a display apparatus is used to provide the processed information to a user.

Figure 1:
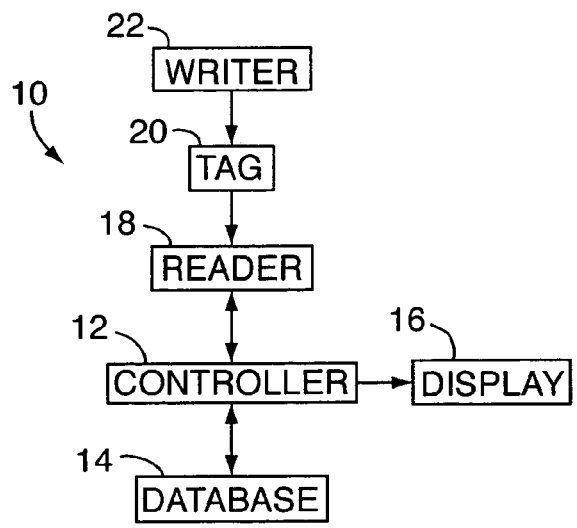
FIG. 1 is a schematic diagram of an electronic identification system for a cargo handling application.
Figure 2:
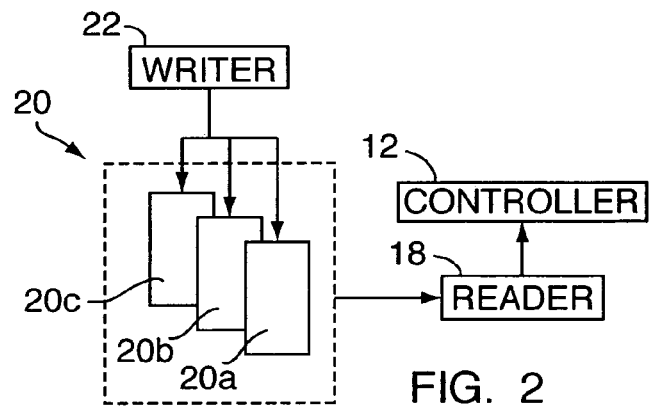
FIG. 2 is a schematic diagram of the system of FIG. 1 in which identifying information is written to a tagging apparatus having multiple tags.

Referring to FIG. 1, the present invention includes an RFID system 10 (hereinafter referred to as "system 10") having a controller 12, a database 14, a display apparatus 16, a reader 18, an RFID tag apparatus 20, and a write apparatus 22. In a preferred embodiment, the controller 12 is a host computer capable of setting forth the operations as disclosed hereinafter and having sufficient memory so as to provide for the proper processing of the information and its display. The tag apparatus 20 preferably includes a plurality of individual tags. Referring to FIG. 2, the tag apparatus 20 is shown as comprising three tags. Although only three tags are shown at 20a, 20b, and 20c, it should be understood that any number of individual tags may comprise the tag apparatus 20.

The individual tags used with the system of the present invention may be passive, active, or a combination thereof. Active tags may include a battery-powered transmitter, which can operate at a range of about 300 feet from the reader. These are fairly expensive and are usually used with shipping containers or railroad cars. Passive tags are more popular because they are typically less than one dollar ($1) in cost. A passive tag has a limited range of less than about ten (10) feet. The mode of operation of the passive tag is significant. In the operation of the passive tag, the reader sends out a radio wave that is received by the antenna on the device. A magnetic field is created from the radio wave to allow the passive tag to draw power to transmit the information stored on the device back to the reader. In some configurations, a battery can be used to broadcast back to the reader for longer distances in certain applications. Depending upon the application, either read-writable or read-only RF tags are used.

In the preferred embodiment, the RFID tag is an Intermec 915 megahertz (MHz) Intellitag, which has a passive operation and is EPC (electronic product code) and ISO (International Standards Organization) compliant. Such a tag has a read range of up to about 13 feet and is mountable on an adhesive strip and can further double as a human readable label. The tag can also announce to a consumer that there is a RFID tag on the particular goods on which the tag is mounted. The Intermec 915 MHz Intellitag is sized to be mounted on merchandise or a container, or on a pallet of goods. The initial RFID tag activation occurs at the point of manufacture.

The tag apparatus 20 is preferably utilized to store data characteristic of the system of the present invention. Examples of the data that can be stored on an individual tag include, but are not limited to, container information (e.g., carton-, pallet-, drum-, tote information and the like), EPC data, product owner information, EPC manager identification numbers and information, global tray identification numbers and/or serial numbers obtained from EPC data, and the like. In addition, the manufacture of global location numbers, the date and time of tag activation, customs harmonizing codes, harmonizing code descriptions, tag level quantities, and tag level units of measure as well can be stored. Customer purchase order numbers or manufacture shop order numbers can also be stored as necessary.

Figure 3:
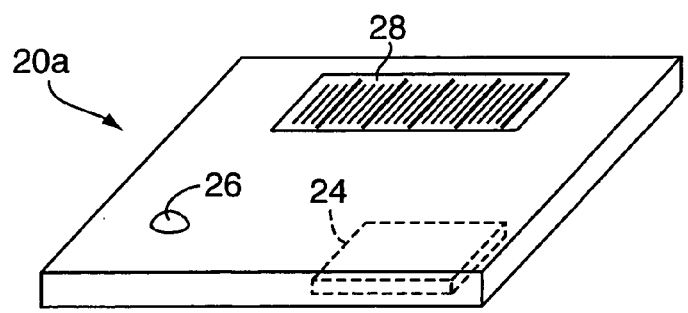
FIG. 3 is a perspective view of a radio frequency tag capable of being utilized with the electronic identification system of the present invention.

Referring now to FIG. 3, the tag 20a preferably includes a sensor 26, an internal memory chip (not shown), and an identifying code 28 (e.g., a bar code capable of being scanned by a scanning device). Optionally, a battery 24 may be included. In embodiments in which a battery is included, the life of the battery 24 is greater than about five years, although duty cycle and operating frequency may contribute to shortening the life significantly. The identifying code 28 may be unique to each tag to aid in the identification of cargo and the tracking and monitoring of shipments. Each tag is mountable inside a container using any suitable method such as adhesive tape, mechanical fasteners, combinations thereof, or the like. Various types of tags may be used, such types typically being configured to monitor temperature, humidity, location, and combinations of the foregoing.

The internal memory chip of the tag 20a typically comprises an EEPROM with 1,024 bits total memory. Byte boundary memory addressing and byte boundary memory locks are used. The communications platform used to receive data from the polled tags is preferably an anti-collision protocol binary tree-type anti-collision algorithm.

In a preferred embodiment, the tag apparatus 20 is incorporated into an electronic seal apparatus that is placed on an item or a package, carton, pallet, tote, drum, carboy, or other container that is closed and sealed. The seal apparatus contains pertinent container information and has the ability to indicate if the seal has been subject to tampering. The seal apparatus may be an adhesive tape in which the tag apparatus 20 is embedded, or it may be a device having the tag apparatus 20 that can be bolted, screwed, or otherwise mechanically attached to the container being closed and sealed. Additional seals are attached as desired.

Figure 4:
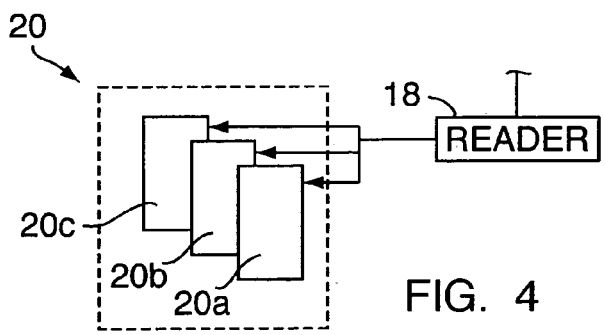
FIG. 4 is a schematic diagram of the system of FIG. 1 in which identifying information is read from a tagging apparatus having multiple tags.

Referring to FIG. 4, one exemplary embodiment of the reader 18 has the capability to query and read a tag from the tag apparatus 20 (e.g., tags 20a, 20b, and 20c), view data from tags, write tag data, clear tag data, and view sensor and alarm data for tags (as applicable). Several readers 18 can be connected on a single network.

The preferred system uses an Intermec ITRF91501 reader, which is a 915 MHz fixed reader and tag writer having four (4) address antenna ports, an RS232 serial port, and the capability of reading a tag within twelve milliseconds and performing a verified write at an average of 31 milliseconds per byte per tag. Such a device reads at a distance of about 3 meters with a single antenna.

Figure 5:
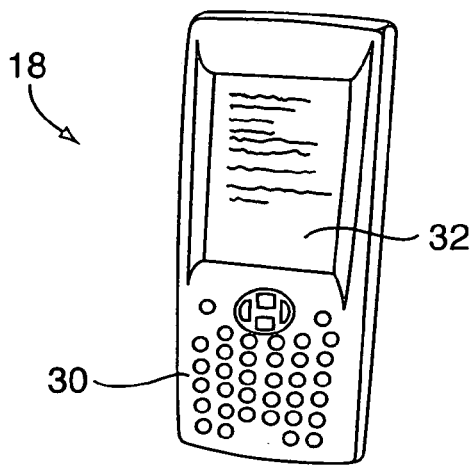
FIGS. 5 and 6 are perspective views of a handheld reading device capable of being utilized with the electronic identification system of the present invention.
Figure 6:
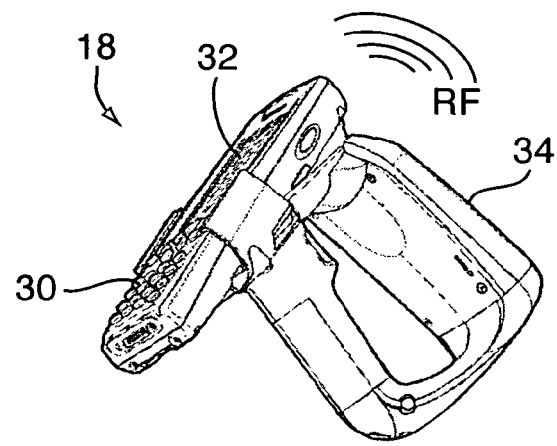

Alternatively, the reader 18 may be an Intermec IP3 portable reader used by personnel at a remote location. Referring now to FIGS. 5 and 6, the Intermec IP3 has mobile read/write capability and includes an Intermec 700 series mobile computer. Reading operations are effected by an internal circularly polarized antenna powered by a rechargeable lithium ion battery pack, and the computer powers the system application to process the RFID tag data. An alphanumeric keypad 30 and a screen 32 facilitate input/output communication from and to a user. The portable reader is built for indoor and outdoor use and has an operating temperature of +14° to +140° F., is rain- and dust resistant, IP64 compliant, powered by lithium ion 7.2 volt batteries, and uses Microsoft Windows for Pocket PC as an operating system. There is either 64 megabytes or 128 megabytes of random access memory (RAM) and flash read only memory (ROM) of 32 megabytes. The internal slots have a secure digital and a compact flash (CF) Type II card. It relies on a standard communication protocol of RS232, IrDA1.1 (115 kilobytes per second (KBPS)). Ten (10) base T-Ethernet and USB port configurations of the reader are available. There are integrated radio options and integrated scanner options for the reader as well. Preferably, the reader 18 can be accommodated by a docking station 34 to provide desktop connectivity.

At any time, an authorized user (having a unique user identifier or password and meeting established security requirements) can read a file from the tag apparatus 20 using the reader 18 to verify the contents of a container. In a preferred embodiment of the present invention, the read file can be copied or transferred to a computer or other control device (e.g., a laptop computer, a desktop computer, or a personal digital assistant (PDA)). Details of a bill of lading may be generated, displayed, printed, or transmitted to a central computer for processing. Using reader(s) 18, the container can be scanned and the results passed to the same device to which the file was loaded. Under a control mechanism (e.g., software), the device can compare the bill of lading data to the scanned data and prepare a report of discrepancies requiring investigation. The report may be printed or displayed.

Referring back to FIGS. 1 and 2, the write apparatus 22 is preferably an Intermec PM4I EasyCoder having an Easy-LAN 100/10 Base T Internal Ethernet configuration and being operable using IPL Printer Command Language software and an Intermec LabelShop START Label Design and Print package. Such a device has 4 megabytes of Flash ROM and 8 megabytes of SDRAM and operates with an auto-switch power supply of 115/230 volts AC.

Figure 7:
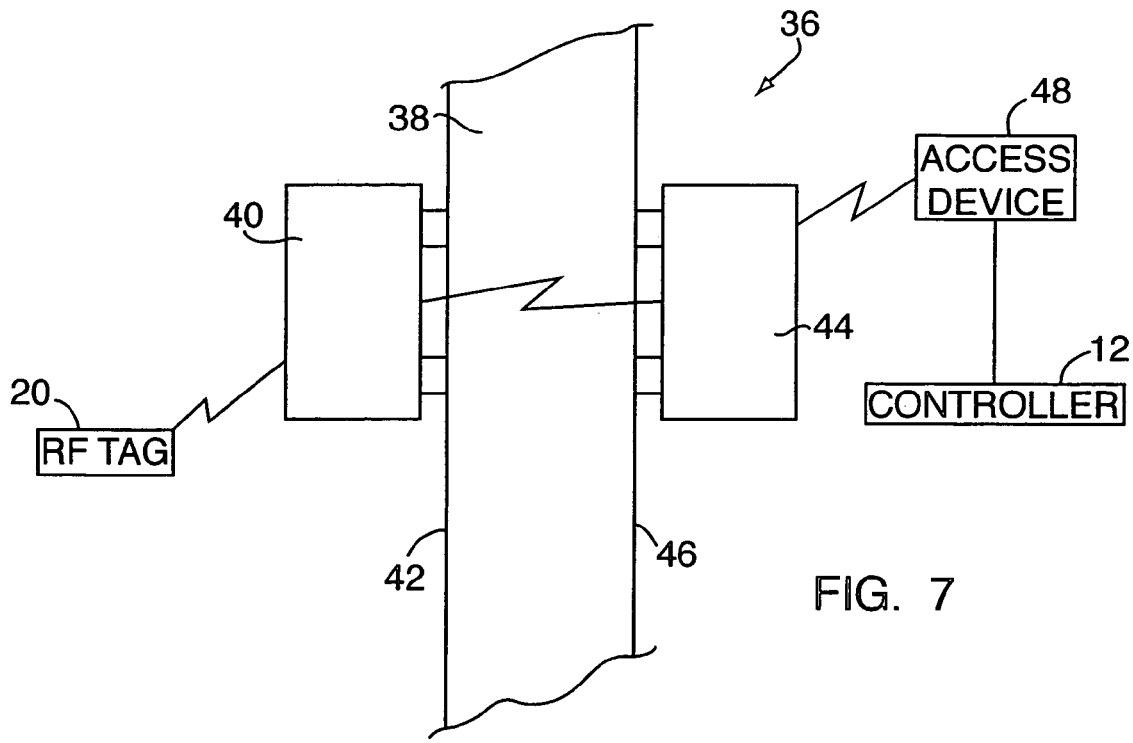
FIG. 7 is a schematic diagram of a transceiver system capable of providing communication through metal walls.

Referring now to FIG. 7, the preferred system also includes a barrier communication system 36 for use in communicating through the wall 38 of a metal container. The barrier communication system 36 comprises a transceiver system capable of maintaining the bi-directional asynchronous transmission of radio signals through metal. The transceiver system comprises dual transceivers, a first transceiver 40 being attached to an inner surface 42 of the wall 38 and a second transceiver 44 being attached to an outer surface 46 of the wall 38 of the metal container. The first transceiver 40 and the second transceiver 44 communicate via radio frequency with tags 20 inside the container and a reader outside the container to provide an accurate fingerprint signature of goods being shipped.

The first transceiver 40 and the second transceiver 44 may be battery powered and have a data communication ability of 100 KBPS. The radio frequency modulation uses amplitude shift keying (ASK), and the device can be used between temperatures from 0° C. to 50° C. Preferably, the transceivers of the barrier communication system 36 are water and dust resistant.

The second transceiver 44 is integratable with a radio access point (RAP) device 48 in communication with the controller 12. The RAP device 48 is a fixed unit on the container which provides for communication ability with tags mounted inside the container. It can be mounted as required in proximity to the cargo or the staging area. The RAP transceiver is preferably designed to read up to 1,000 tags in a single read, providing approximately 100 tags in 15 seconds. The device operates at a frequency of about 433.92 MHz. The read range is up to about 30 feet, which is further subject to tag orientation and the type of metal from which the container is fabricated.

The system 10, as described above with reference to FIGS. 1 to 7, is configured to be computer controllable via the controller 12 to collect the data. It easily connects to a PC data control system through a high performance Ethernet network interface cable.

The electronic machines of the system described above are capable of inputting, processing, storing, and transmitting data pertaining to goods and linking such data to various terminals via the execution of various algorithms as are described hereinafter. The data may also be adapted to be cross-referenced with existing databases to provide functions that track the goods during shipment. The data may further be adapted to provide a system for inventory control or to monitor various environmental conditions. The system itself can be read-only or write-enabled to allow for varying degrees of security. An external storage device (e.g., a CD ROM or the like) can be utilized to provide the necessary readouts.

The system provides for the non-intrusive, remote, wireless tracking of shipped goods between destinations while optimizing the integrity of the shipment itself, namely, limiting and preferably eliminating the opportunity for theft, damage, or the addition of materials that would create an undesirable or hazardous condition, thereby reducing the opportunity for a security breach to occur. The use of the two-way RF transmission technology allows for the sealing of a container of goods with a tamper-proof seal and the monitoring of the state of the container to determine pertinent parameters of the shipping process. Preferably, the transmission of the data is integrated via satellite, GPRS (general packet radio service), or cellular applications to provide real-time or near real-time analysis.

Generally, information is exchanged between the transmitting and receiving devices, such information being selectively polled to provide an interrogation of the container. The information may include, for example, at least the identity of a manufacturer of the goods. Also, such information may comprise data that renders the goods traceable (e.g., identifying model- and batch numbers of the goods). Alternatively, the shipper of goods that were not initially sealed and are put into a container of mixed goods would seal the container and add the identifying information for the goods to the existing identifying information.

The container can be adapted for use with any aggregation of product. For example, the container can be adapted for use with single units of goods, cases of single units of goods, drums, totes, carboys, or larger aggregations of product such as pallets of cases, pallets of drums, pallets of carboys, bulk cargo containers of pallets or trucks of pallets, and the like. In any arrangement or nesting of arrangements, characteristic signatures are generated by the RFID tag devices. Depending upon the actual nesting arrangements (e.g., cases on pallets and pallets in cargo containers), different tiers are formed. Each tier has a characteristic signature that can be electronically polled at any time to verify the integrity of the container, the seals on the container, or the contents. The electronic polling provides for an interrogation of the units by relying on changes in a magnetic field flux. The second (or subsequent) tiers of any arrangement include the contents of multiple containers and/or smaller shipping units. The characteristic signature of each tier can be combined to produce an aggregate signature that is characteristic of any portion of the total number of tiers. A total aggregate signature should properly correspond with an overall characteristic signature of the largest tier. A comparison of a reading of the total aggregate signature with a stored signature should result in the same value. Any deviation between the signatures is indicative of a security breach.

The signatures, either individually or aggregations thereof, are recorded and can be provided to the requisite government agencies as needed and in response to conformance with the proper protocol. Such government agencies may then have the option of interrogating the container; reading the radio frequency identification and generating a real-time signature at various points during the course of the shipment as permitted by law.

Figure 8A:
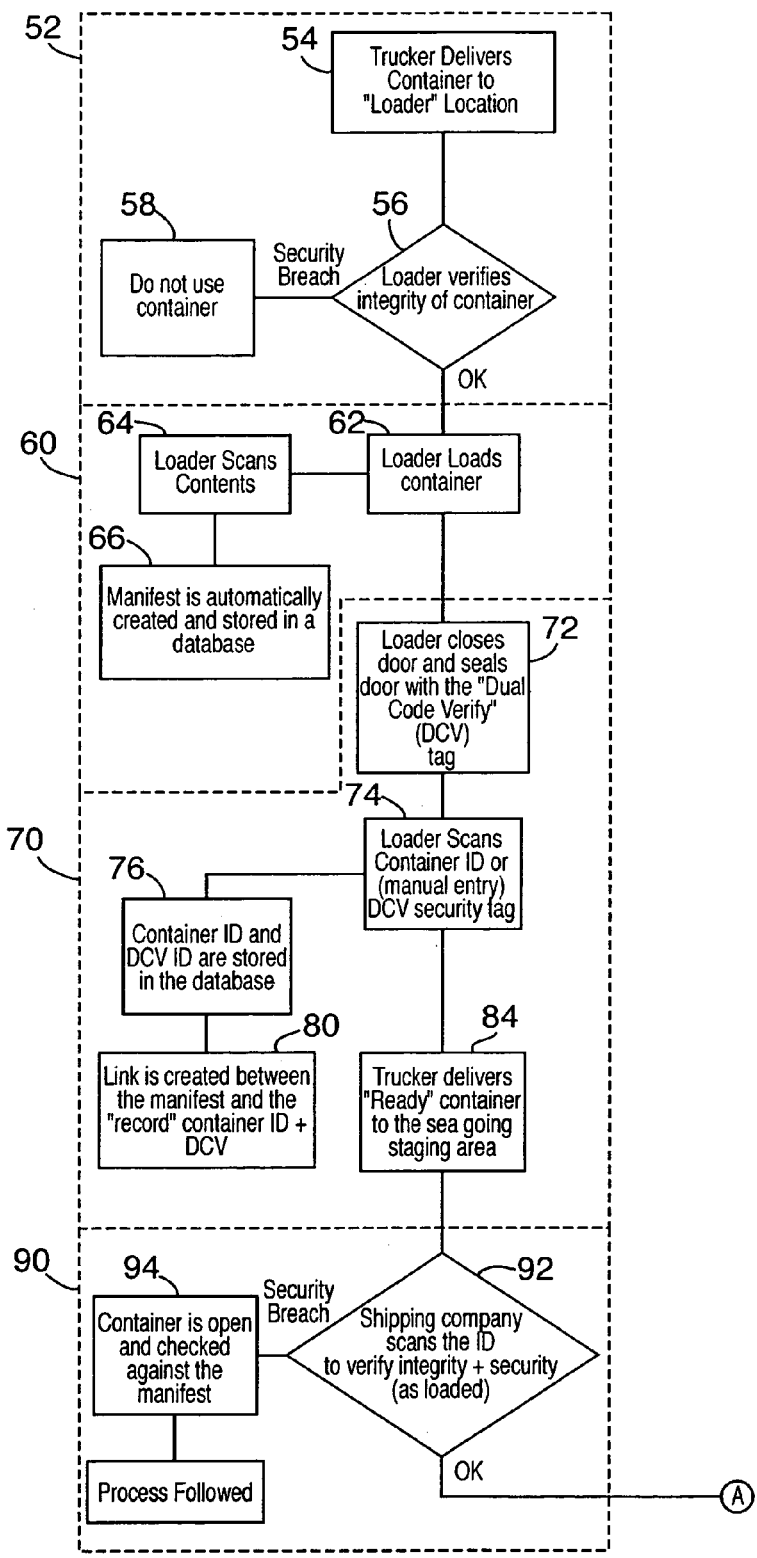
FIG. 8 is a flow diagram illustrating a procedure for inputting, processing, and storing data related to goods in commerce using an electronic identification device and system according to the present invention.
Figure 8B:
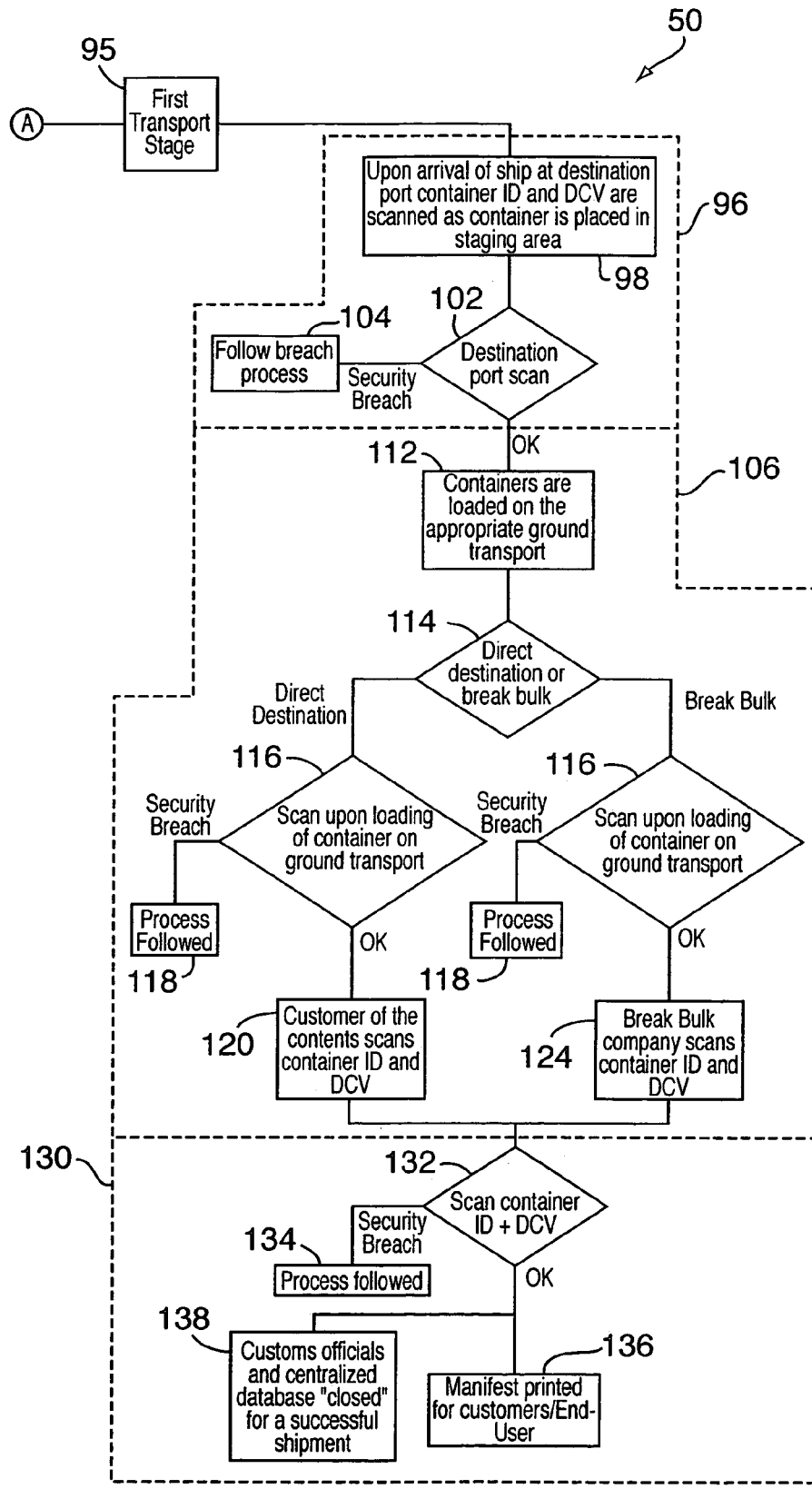

Referring to FIGS. 8 through 22, various algorithms used by the system of the present invention operates are shown. In FIG. 8, the operation of the system of the present invention is shown at 50 and includes various stages at which different functions occur, the summation of which result in the transfer of goods from a supplier to a distributor.

In a first stage 52, a container is prepared to receive goods. Such preparation includes a delivery step 54 in which the container is delivered to a location for subsequent loading. After the delivery step, the integrity of the container is verified in a verification step 56. A query at the verification step 56 results in either the integrity being acceptable or unacceptable. If the answer to the verification step 56 query is that the integrity is unacceptable, control is passed to a decline step 58 in which a conclusion to not use the container until the integrity issue is resolved is reached. If, on the other hand, the answer to the verification step 56 query is that the integrity is acceptable, control is passed to the next stage, which is a loading stage 60.

In the loading stage 60, the container is loaded in a loading step 62 and the contents are scanned in a scanning step 64. Also, a manifest is automatically created and stored in a database in a manifest-creating step 66. The loading step 62, the scanning step 64, and the manifest-creating step 66 may all be executed in any order or simultaneously. Once the steps 62, 64, and 66 of the loading stage 60 are completed, a carrier delivery stage 70 is executed.

The carrier delivery stage 70 includes a sealing step 72 in which the loader closes and seals the door with a "dual code verify" (DCV) tag. In a scanning step 74, the loader then scans or manually enters either or both an identifier on the container or an identifier on the DCV tag. Simultaneously with or subsequent to the scanning step 74, a storage step 76 and a linking step 80 are executed. In the storage step 76, the identifier from the scanning step 74 is stored in the database. In the linking step 80, communication is established between the manifest created in the manifest-creating step 66 above and the identifier from the scanning step 74. Once the scanning step 74, the storage step 76, and the linking step 80 are completed, the container is delivered to the carrier in a delivery step 84.

Once the delivery step 84 is complete, the integrity of the container is verified in a verification stage 90. A security check step 92 is executed in which the carrier scans the identification code. If it is determined that the security has been breached, a breach check step 94 is executed in which the container is opened and guidelines detailing security procedures are followed. If the security of the container has not been breached, the container is shipped (a first transport stage 95). At any point in the shipping process, the container can be polled to assess the characteristic signatures in an effort to determine if a security breach has occurred. This ability is especially useful when shipping by sea because a vessel can be maintained offshore for extended periods of time to resolve a detected security breach.

Upon arrival of the shipped container at its destination, a staging process 96 is executed. In the staging process 96, the container is placed in a staging area and scanned (first scanning step 98). The container is scanned a second time in a second scanning step 102 to determine its destination port. If it is determined that a breach of security has occurred, a breach step 104 that details security procedures is followed. If no breach has occurred, control is passed to a second transport stage 106.

In the second transport stage 106, a load step 112 is executed in which the container is loaded on the appropriate ground transport. A decision 114 is then made as to whether the container is to be shipped directly to the destination or whether the bulk of the container is to be broken into separate shipments (i.e., disassembled and reassembled into a plurality of vehicles for delivery to multiple destinations). In either case, the container is scanned in a scanning step 116 upon being loaded onto the ground transport. Security procedures 118 exist in the event that a security breach has been detected. If the container is to be shipped directly to the destination, the customer of the contents scans the container ID and DCV in a customer-scanning step 120. If, on the other hand, the container is a "bulk break" shipment, the company handling the bulk break scans the ID and DCV in a bulk break-scanning step 124. In either case, a closing step 130 is then executed.

At any point in either or both the first transport stage 95 or the second transport stage 106, the aggregate tier signature of the transporting vessel can be created and logged for later comparisons with subsequently created signatures. Furthermore, the tier signature can be recreated and reassessed multiple times throughout the shipping phase in an effort to pinpoint locations at which security breaches occur.

In the closing step 130, the ID and DCV are again scanned in a scanning step 132. In the event that a security breach is detected, an outlined procedure 134 is followed. If no security breach is detected, a manifest is printed for the end-user in a printing step 136 and a customs facility closes a centralized database in a closing step 138.

Figure 9:
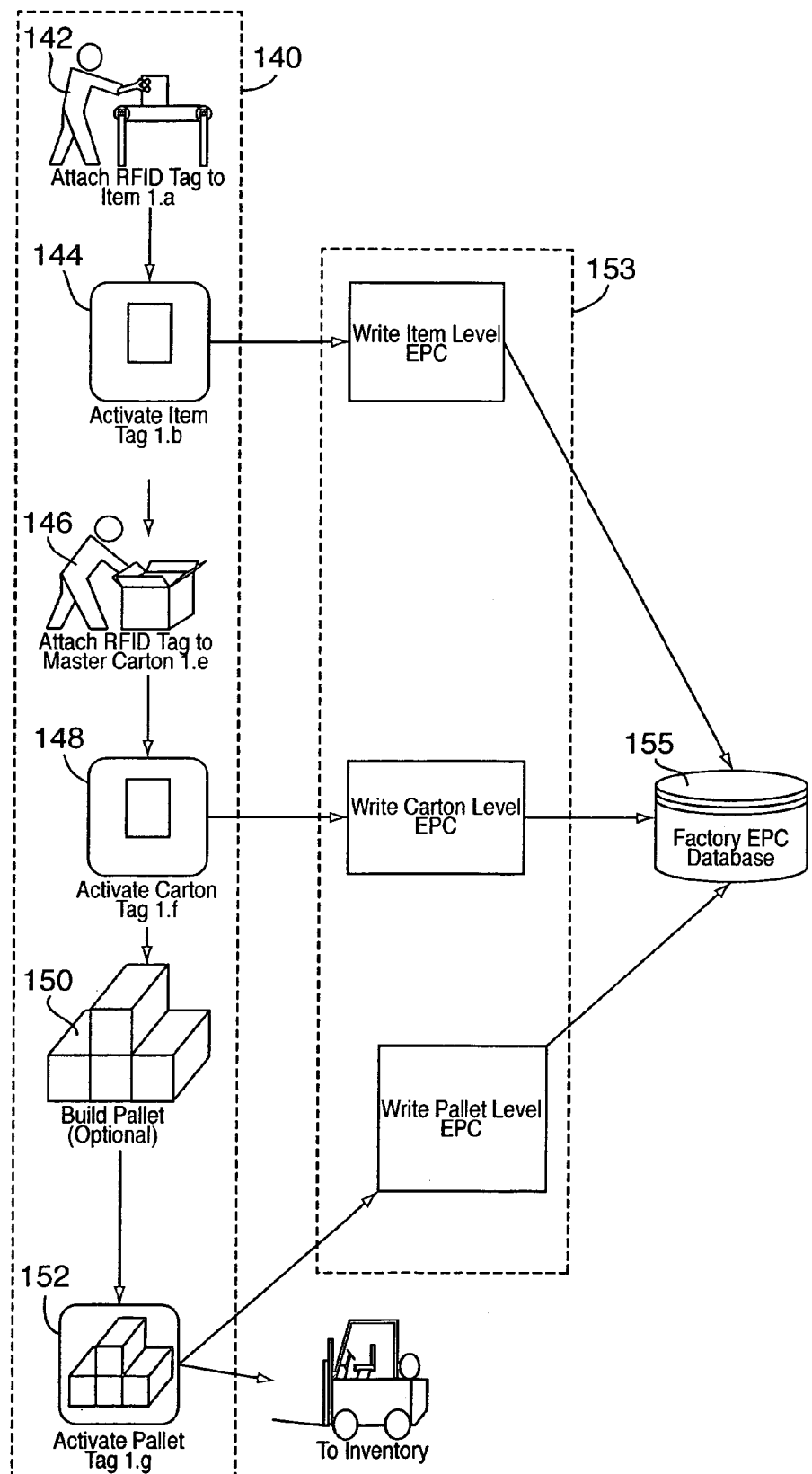
FIG. 9 is a simplified flow diagram illustrating a procedure for tagging, packing, and storing goods in inventory using an electronic identification device and system of the present invention.

Referring now to FIG. 9, preparation for the loading stage 20 is shown at 140. The loading preparation step 140 comprises a series of manual or automated procedures that result in goods being packed in various arrangements. In particular, the loading preparation step 140 comprises a first step 142 in which a worker (or a machine) attaches an RFID apparatus to each individual item of goods. The RFID apparatus is preferably a passive radio frequency tag having a stand-alone memory component (e.g., 1,024 bits total) that operates in the megahertz range and has byte boundary memory addressing and locking capabilities.

In an activation step 144, each RFID apparatus is activated either before or after being packed into a carton. The signatures of each individual item that are generated at this point are referred to as the "first tier signatures."

In a third step 146, an RFID apparatus is attached to the carton to seal the carton and at an activation step 148, the RFID of the carton is activated. At this point, the aggregate signature of the individual items in the carton (the first tier signature) equals the signature of the carton from the activation step 148. The signature of the carton is referred to as a "second tier signature." In an optional step 150, the cartons are assembled into a pallet or other quantum measure of an assembly of individual cartons. If the optional step 150 is executed, an RFID apparatus is attached to the pallet or other quantum and activated in an activation step 152. The signature of each pallet or other quantum is an aggregation of the first tier signatures and also an aggregation of the second tier signatures.

At any of the activation steps 144, 148, 152, a scanning step 153 is executed and data is written to an electronic product code (EPC) from each level to create the tier signature. Such signatures are read utilizing a fixed reader that operates preferably in the megahertz range (corresponding to the radio frequency tag). All of the data is compiled in a factory EPC database at a manifest-creating step 155 via an Ethernet connection. The items, cartons, or pallets are then passed to inventory.

Figure 10:
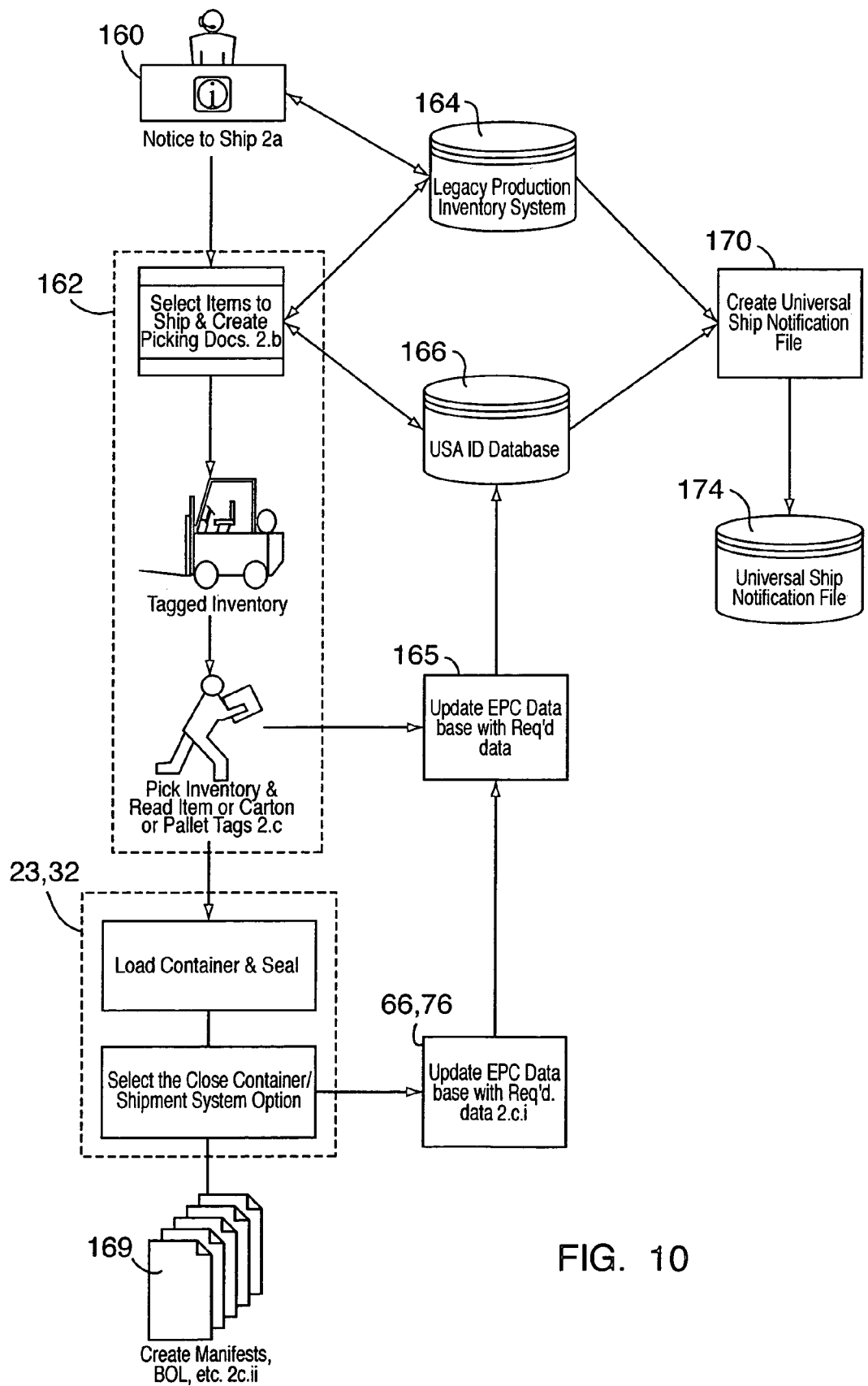
FIG. 10 is a simplified flow diagram illustrating procedures for picking goods from inventory, loading the goods into a container, and updating inventory files.

Referring now to FIG. 10, items are taken from the inventory and transferred to the loading stage 60. In the loading stage 60, a notice step 160 is executed in which a notice to ship is received. Items (cartons, pallets, or the like) are then selected from the inventory in a picking step 162. The items are checked against an inventory system 164 and an update step 165 is utilized to update an identification database 166. A universal ship notification file is created in a creation step 170, and the resulting data is used to update a Universal Ship Notification File Database 174. After the picking step 162, the loading step 62 and the sealing step 72 are executed (and the identification database 166 is updated via the manifest-creating step 66 and the storage step 76). The inventory from the picking step 162 is read using either the fixed reader and tag writer or the battery powered portable reader. Manifests, bills of lading, or similar documentation may be produced in a documentation step 169.

Figure 11:
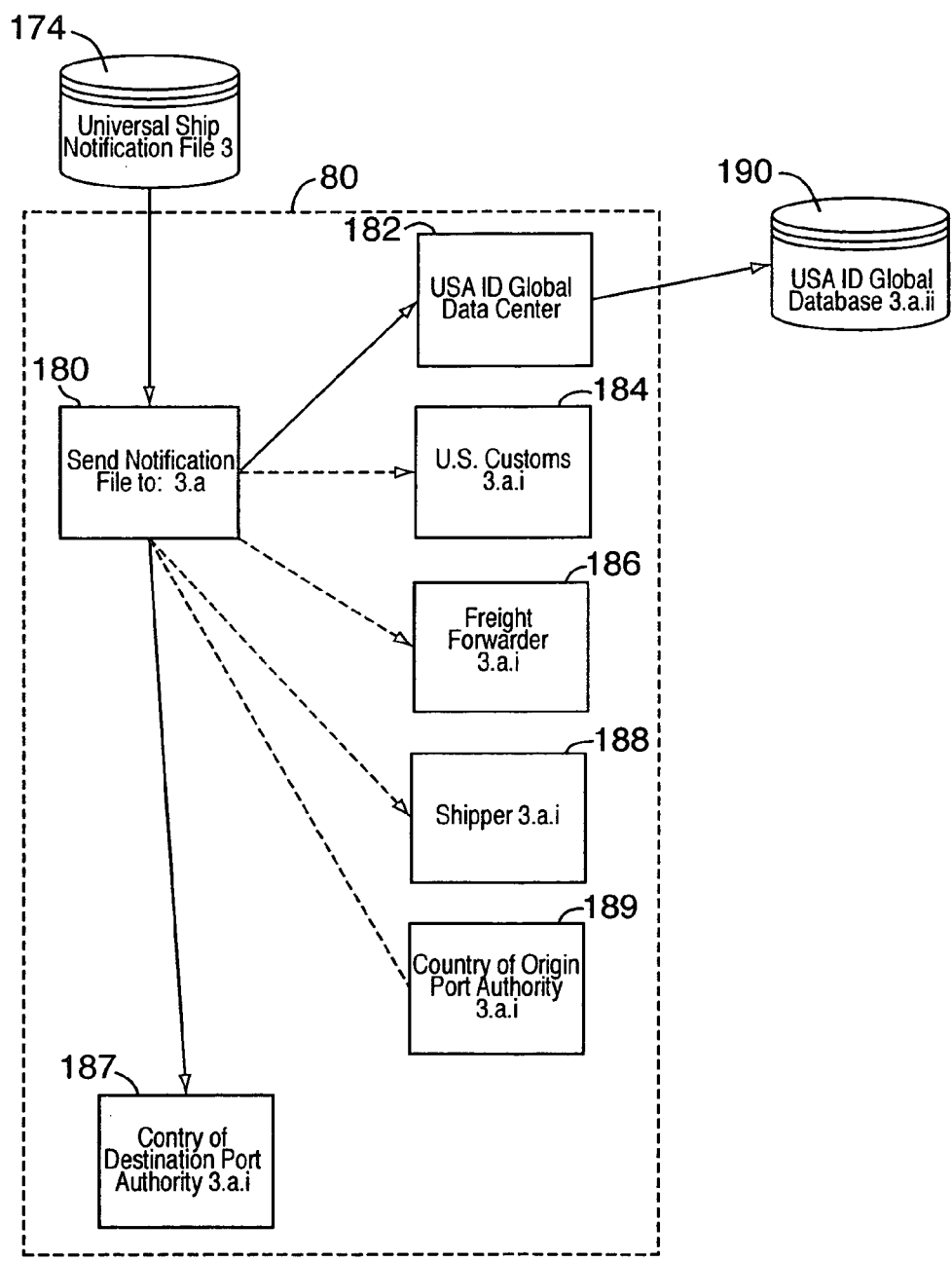
FIG. 11 is a simplified flow diagram illustrating various linking steps between electronic inventory files, various data users, and a main database.

Referring to FIG. 11, after the sealing step 72 is executed and the identification database 166 is updated, the Universal Ship Notification File Database 174 is used to create the links in the linking step 80. In the linking step 80, data is received by the present system from the Universal Ship Notification File Database 174 and is incorporated into a send notification file 180. From the send notification file 180, communication links are established between, for example, a global data center 182, a U.S. Customs Office 184, a freight forward company 186, a shipper 188, a port authority at a country of destination 187, a port authority at a country of origin 189, and the like. A link is also established between the global data center 182 and a Global Database 190 maintained and accessible by an authorized user (e.g., U.S. Customs or U.S. Homeland Security).

In the operation of the Global Database 190, manufacturers transmit shipment data to the global data center 182, and all subsequent inquiries are made against the Global Database 190. Individual shipment information may be downloaded from the Global Database 190 to the authorized user's own application.

Figure 12:
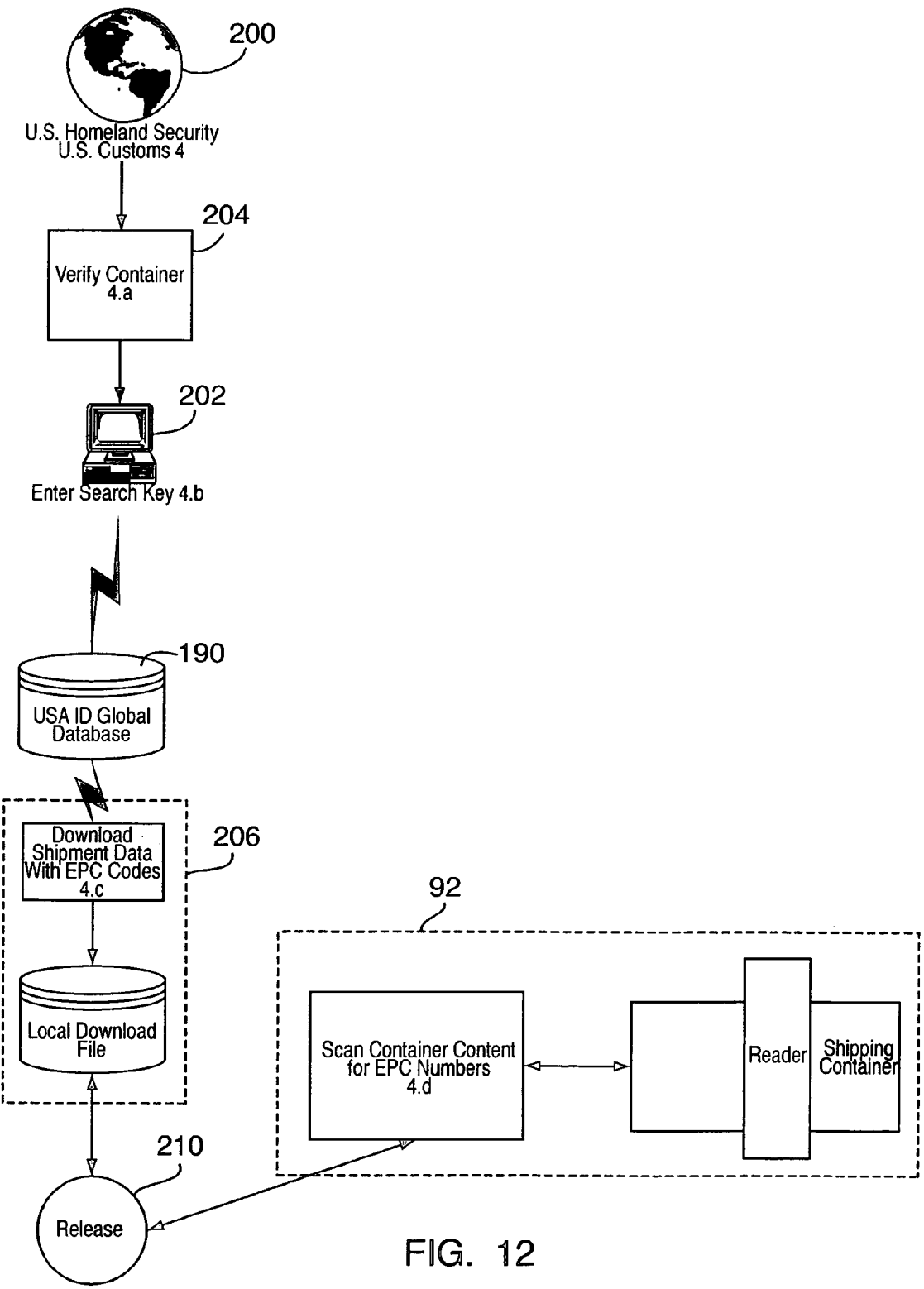
FIG. 12 is a flow diagram illustrating access protocols for two exemplary users of the system of the present invention.

Referring now to FIG. 12, remote links between the Global Database allow for communication between the authorized user and a transport facility executing the first transport stage (shown at 95 with reference to FIG. 8). In the link to the authorized user 200, a search key enter step 202 is executed, the container is verified in a step 204, and the relevant authorities receive the desired information. In the link to the shipper, EPC codes are downloaded in a download step 206 to a release stage 210. Prior to executing the release stage 210, the security check step 92 is executed in which the carrier scans the identification code to verify the integrity and security of the container.

Figure 13:
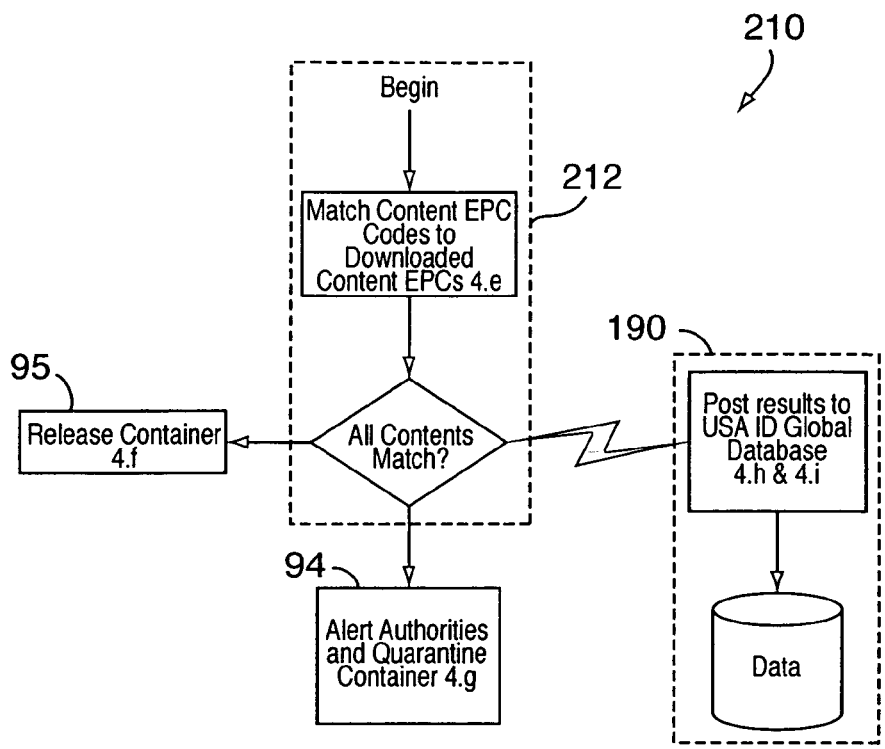
FIG. 13 is a flow diagram illustrating the release protocols for goods being shipped.

Referring now to FIG. 13, the release stage 210 is initiated by a matching step 212 in which the contents of all EPC codes are matched to the downloaded content EPC codes. If all contents match, the container is released to the first transit stage 95. If the contents do not match, the breach check step 94 is executed in which the container is opened and guidelines detailing security procedures are followed. In either case, the results are posted to the Global Database 190.

Figure 14:
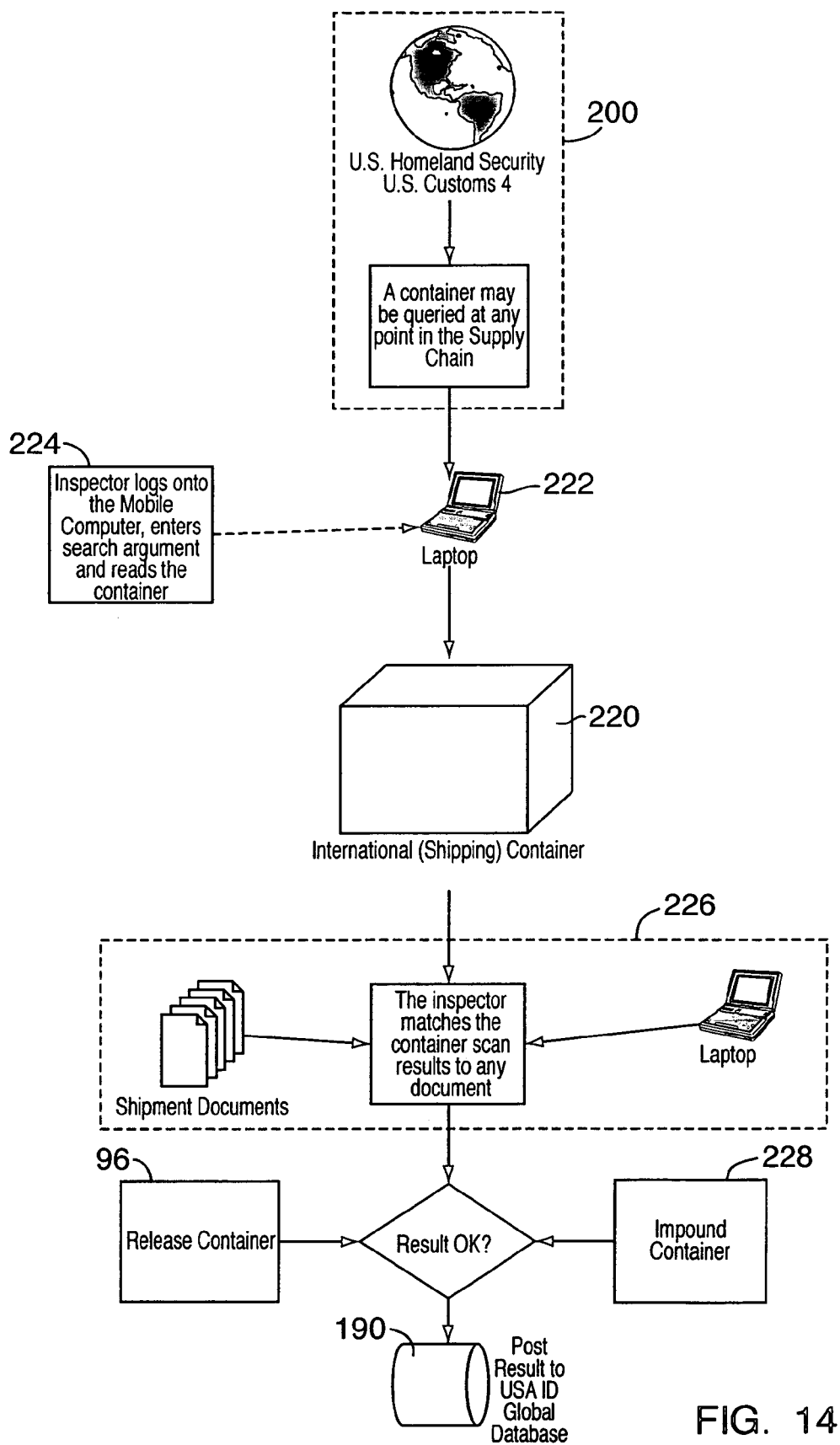
FIG. 14 is a flow diagram illustrating in-transit procedures for monitoring containerized goods.

Referring now to FIG. 14, a mobile inspection process in which the container is verified during transit in the first (or subsequent) transit stage 95 includes signature matching steps and release/quarantine steps. The container, which is shown at 220, emits its characteristic tier signals that are polled in a polling step 222 either at the discretion of the shipper (step 224) or at the discretion of the authorized user 200. In a matching step 226, the signatures are compared to the relevant document. If the results match, the container is released to the staging process 96. If the results do not match, an impound step 228 is executed in which the container is impounded, preferably at sea. In either case, the results are posted to the Global Database 190.

Figure 17:
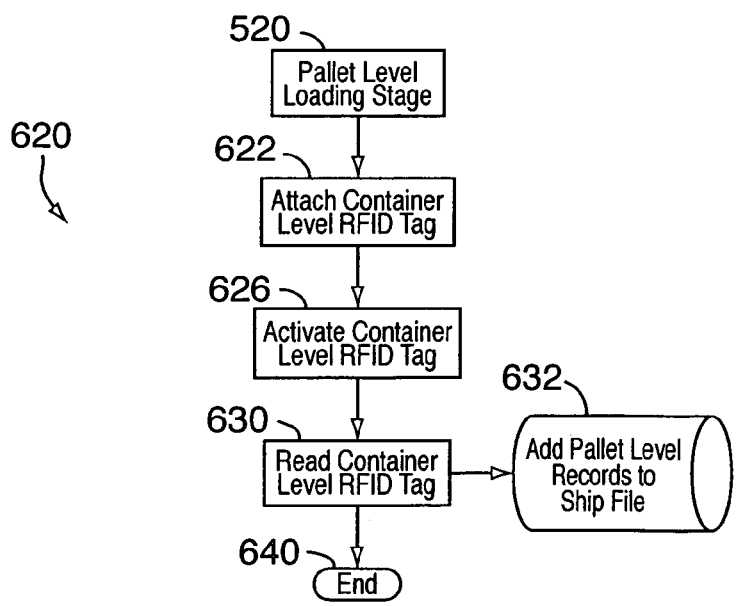
FIGS. 15, 16, and 17 are flow diagrams illustrating an alternative embodiment of loading stages.
Figure 15:
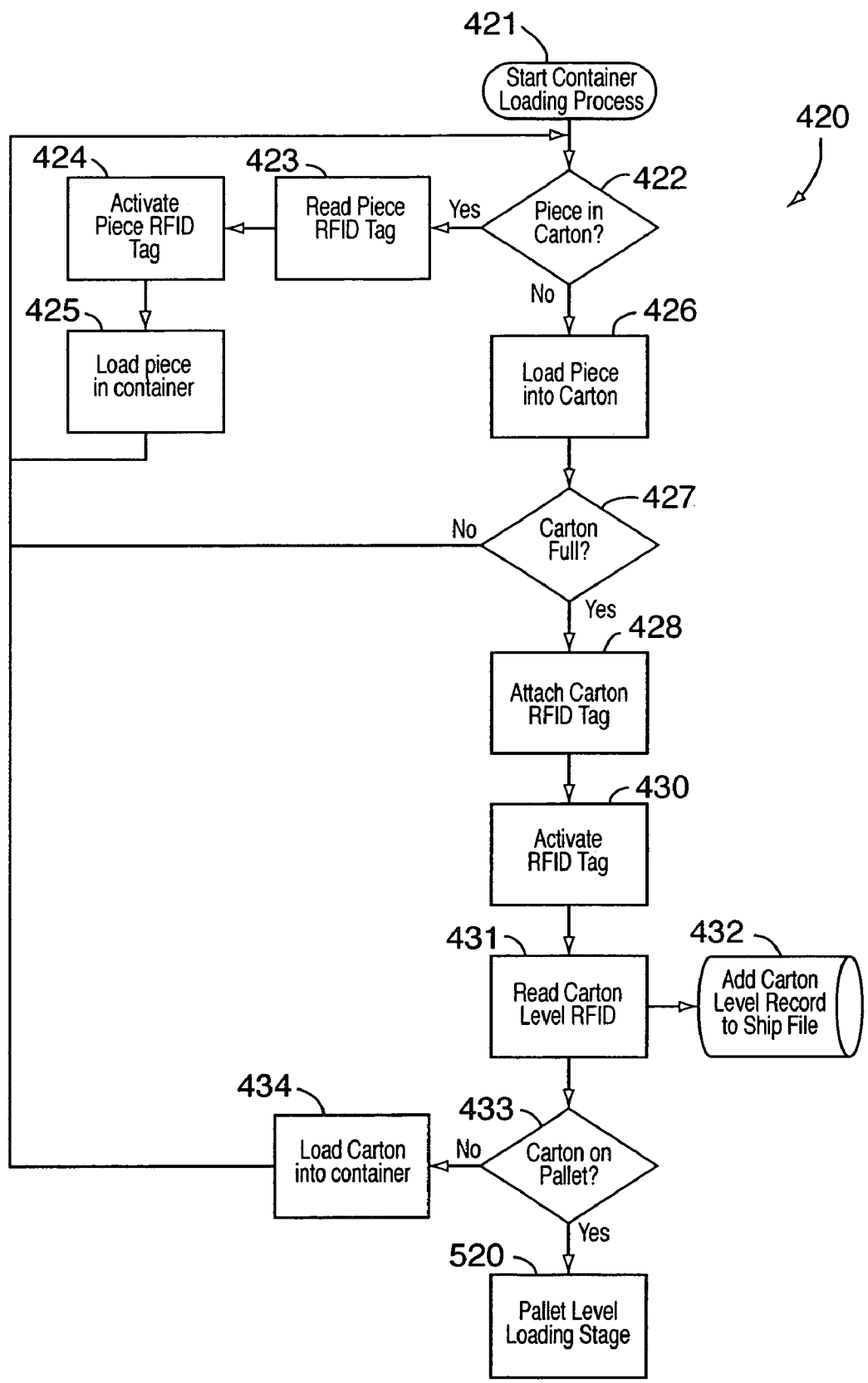
Figure 16:
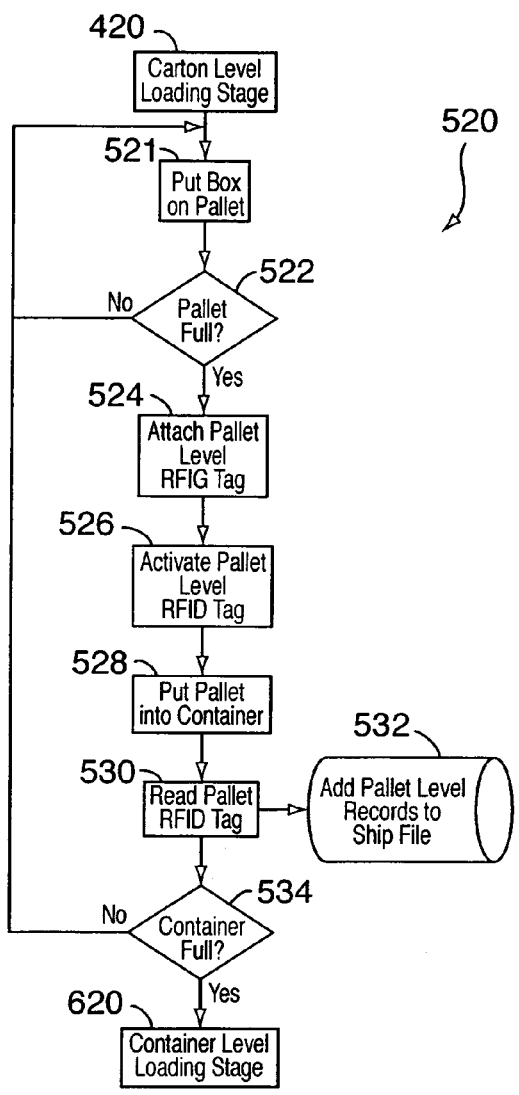

Referring now to FIGS. 15, 16, and 17 alternative embodiments of loading stages are shown. In FIG. 15, a carton level loading stage is shown at 420. In the carton level loading stage 420, a container loading process 421 is initiated. A query 422 is executed to determine if an item has been placed in a carton. If the item has been placed in the carton, the RFID tag is read in an tag read step 423, the tag is activated in an activation step 424, and the container is loaded in a load step 425. The query 422 is then re-executed. If the item has not been placed in the carton, the piece is loaded into the carton in load step 426 and a query 427 is made to determine if the carton is full. If the carton is not full, the process is restarted from the query 422. If the carton is full, the RFID tag is attached in an attach step 428, and the tag is activated in an activation step 430, and a characteristic signature is read at the carton level in a reading step 431. A carton level record is added to a file in a filing step 432. From the reading step 431, a query 433 is made to determine if the carton is to be placed on a pallet. If the carton is not to be placed onto a pallet, the carton is loaded into a container in a load step 434 and query 422 is re-executed to load another carton. If the carton is to be placed on a pallet, a pallet level loading stage 520 is executed.

Referring to FIG. 16, in one embodiment of the pallet level loading stage 520 (subsequent to the carton level loading stage 420), a carton (or similar item) is loaded onto a pallet in a loading step 521. A query 522 is made to determine if the pallet is full. If the pallet is not full, the container loading process from the carton level loading stage 420 is re-executed. If the pallet is full, an RFID tag is attached to the pallet in an attaching step 524, the tag is activated at the pallet level in an activation step 526, the pallet is put into a container in a loading step 528, and the pallet RFID tag is read in a pallet level reading step 530. A pallet level record is added to a file in a filing step 532. From the reading step 530, a query 534 is made to determine if the container into which the pallet is to be placed is full. If the container is not full, then the carton level loading stage 420 is re-executed. If the container is full, then a container level stage 620 is executed.

Referring now to FIG. 17, the container level stage 620 is initiated by the pallet level loading stage 520. A container level RFID tag is attached in an attaching step 622, and the tag is activated at the container level in an activation step 626 and read in a container level reading step 630. A container level record is then added to a file in a filing step 632. The process is then terminated in a closeout step 640.

Figure 18:
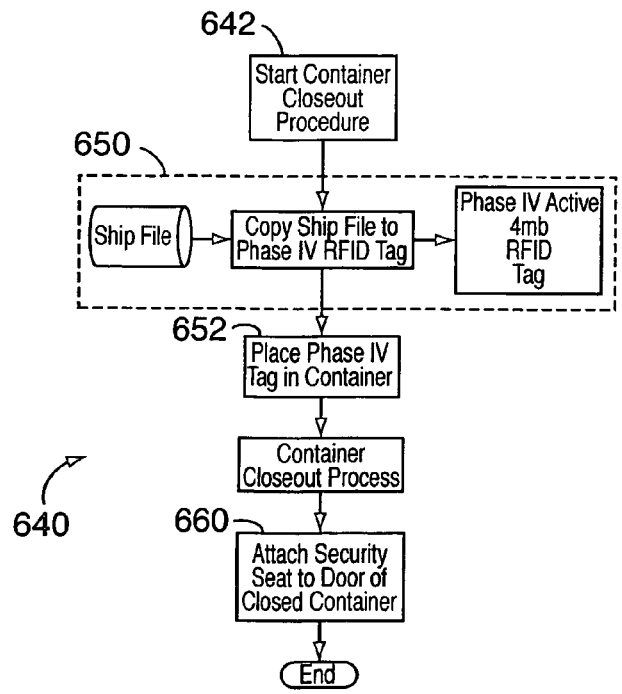
FIG. 18 is a flow diagram illustrating one embodiment of a closeout step.

A loaded container may be dosed out in a closeout step 640, one embodiment of which is shown with reference to FIG. 18. In the closeout step 640, a container closeout procedure is initiated in an initiation step 642. All records are copied from the file to an aggregation tag in a copy step 650. The aggregation tag is placed into the container in an attachment step 652, and a seal is attached to a door or hatch of the closed container in a seal step 660.

Figure 19:
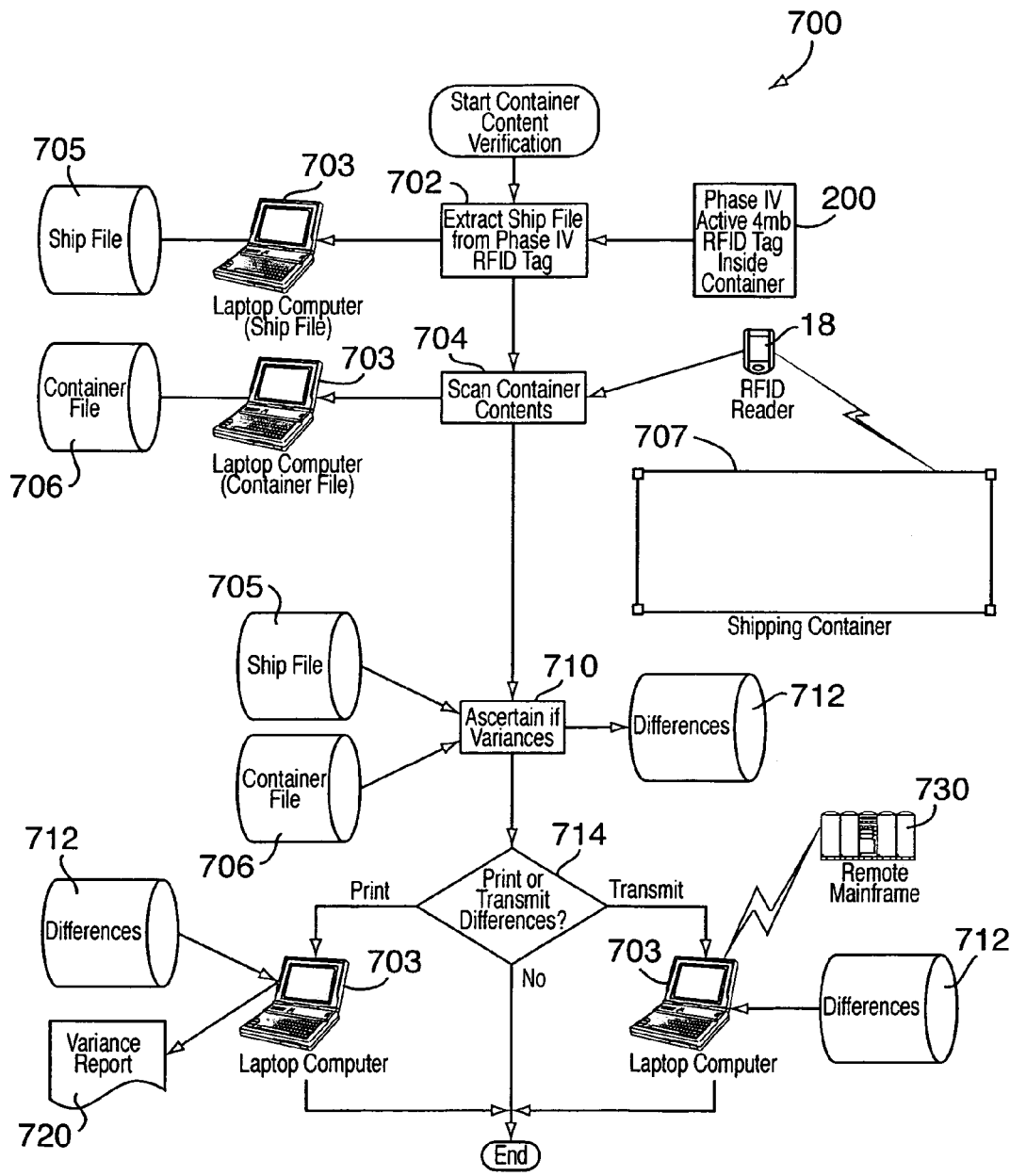
FIG. 19 is a flow diagram illustrating one embodiment of a verification step.

One embodiment of a verification step is shown with reference to FIG. 19. In the verification step, which is shown at 700, after all data security measures are satisfied, a file is downloaded from a tag 20*a* inside a container 707 to a computer 703 that contains variation notification software in an extraction step 702 to produce a shipping file 705 (bill of lading). The container is then scanned with a reader 18 in a scan step 704 and the scanned data is passed into a container file 706 on a device (which may or may not be the computer 703) that contains the variation notification software. The software is then run to compare the shipping file 705 to the container file 706 in a comparison step 710 to determine differences 712 between the two files 705, 706, thereby ascertaining shortages or overages in the container 707.

The results are displayed and shortages or overages are verified through repeat scans. A query 714 is made to determine if the data indicative of the differences 712 should be printed or transmitted to a remote location. If the differences 712 are to be printed, the computer 703 (or any other computer) may analyze the differences 712 and print out the appropriate variance report 720. If the differences 712 are to be transmitted to a remote location, data is transmitted to a computer (e.g., computer 703), the differences 712 are analyzed, and the appropriate report is transmitted, e.g., to a mainframe computer 730 at a remote location.

Figure 20:
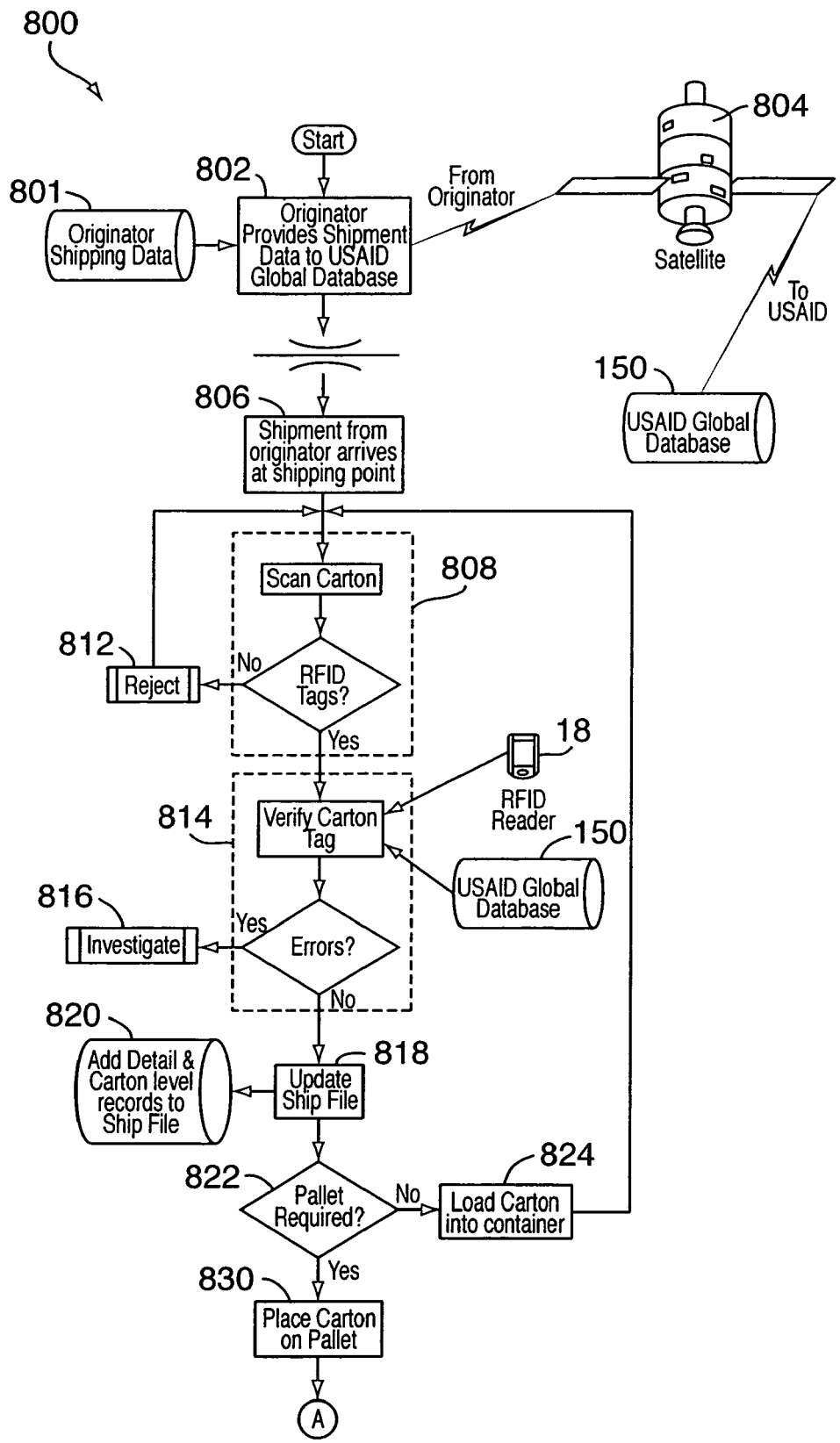
FIG. 20 is a flow diagram illustrating a first portion of one embodiment of a multiple container shipping process.
Figure 21:
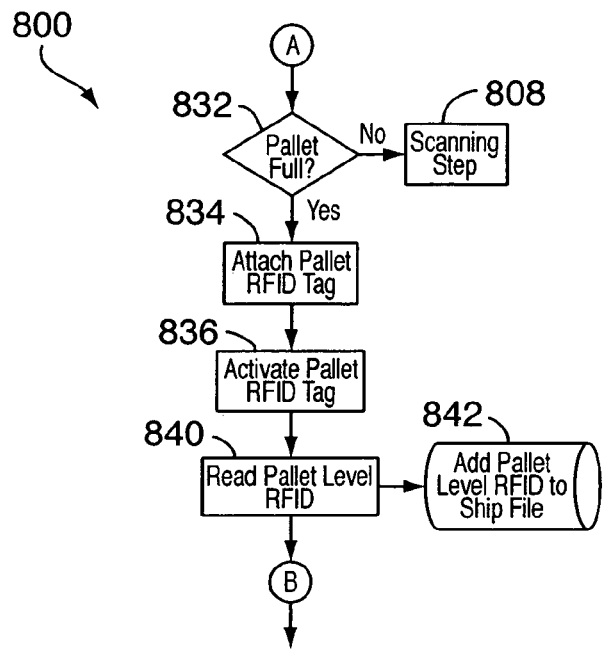
FIG. 21 is a flow diagram illustrating a second portion of one embodiment of a multiple container shipping process.
Figure 22:
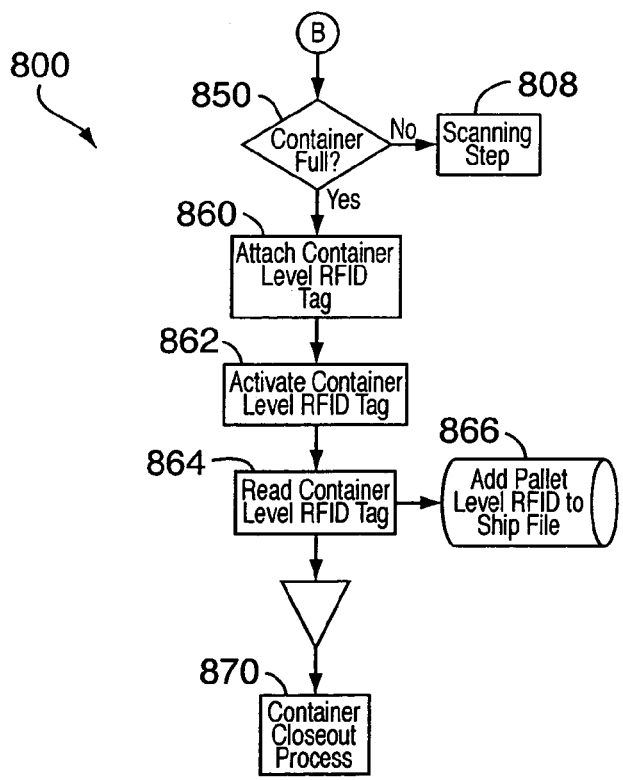
FIG. 22 is a flow diagram illustrating a third portion of one embodiment of a multiple container shipping process.

In another aspect of the present invention, as is shown with reference to FIGS. 20 through 22, multiple shipments may be processed, verified, and tracked using the apparatus as disclosed above in a multiple shipment process 800. Such an application may be described as a Cargo Consolidator's Loading Package. In one embodiment, multiple originators of goods may ship their goods to one receiving center. In another embodiment, one originator of goods with multiple plants or dispatch centers may ship goods to one receiving center. In either embodiment, multiple shipments may be consolidated at any point in any number of containers. Preferably, the originator is responsible to ensure that the tags used are EPC compliant and properly formatted (e.g., include the proper item/package and carton level signatures). Furthermore, the pertinent details (from the bill of lading) are already included in an information system database of the consolidating party in appropriate format (for example, identified by shipper, bill of lading number, carton number, and/or transportation identification number (e.g., vessel number, flight number, carrier code, or the like)).

Referring now to FIG. 20, In the loading of containers in a multiple-container shipping process, the originator provides shipment details (from, for example, a bill of lading 801) in a data providing step 802 to a pertinent database (e.g., the Global Database 150) via any suitable apparatus such as satellite 804 or the like. As a package type is selected for shipment arrives at a shipping point for shipping in an arrival step 806, the tag is scanned in a scanning step 808. If the tag is not readable, the carton is rejected in a rejection step 812 and rescanned in the scanning step 808. If the tag is readable, the tag is verified in a verification step 814 using the reader 18 and comparing the result to a database (e.g., the Global Database 150). Errors are flagged and pursued in an investigation step 816. If no errors are detected, software adds the package type to the shipping file 820 in an update step 818. If multiple pieces are in a carton, the software adds all the detail records as well as a carton summary record to the shipping file 820. Throughout the scanning and container loading process, the resulting scans are compared to the bill of lading data, and any discrepancies are noted and reported. A query 822 is made to determine if a pallet is required. If a pallet is not required, items are loaded directly into the container in a loading step 824. If a pallet is required, items are loaded onto the pallet in a loading step 830.

Referring to FIG. 21, after the loading step 830, a query 832 is executed to determine if the pallet being loaded is full. If the pallet is not full, the scanning step 808 (FIG. 22) is executed and the process continues in sequence. If the pallet is full, a pallet level tag is created and attached to the pallet in a tagging step 834 and activated in an activation step 836. The pallet level tag is read in a read step 840, and a record is created in a shipping file in a file step 842. A query 850 is then made to determine if the container is full.

Referring now to FIG. 22, the query 850 is executed. If the container is not full, the scanning step 808 (FIG. 20) is executed and the process continues in sequence. If the pallet is full (or loading is complete and a partially filled container is obtained), a container level tag is created and attached to the container in an attachment step 860. Preferably, the container level tag is embedded within a tamper proof external container seal encoded with the container data and activated in an activation step 862. The tag is read in a read step 864 and added to the shipping file in a file step 866. A container closeout process 870 is then executed.

In the container closeout process, all shipping records related to the container are copied into another tag that is placed inside the container before the container is sealed. Attaching the seal to the outside of the container seals the container.

Tagging at piece-, package type-, pallet-, and container levels allows for analysis to whatever degree of detail is required to produce reports. Characteristic signatures can be read and reported by piece, package type, pallets, or container.

Calculation of the container lading requirements (e.g., weight, dimensions, and the like) is distinct from the loading of the container.

The devices and systems of the present invention may be applicable to warehouse- and yard management procedures. Warehouse efficiency has a direct correlation to inventory optimization, and the use of wireless communications for the shipment of cargo allows for vastly improved control and monitoring of a delivery process for all merchandise that is shipped. In particular, when the contents of a container and the container itself are tagged with an RFID device, the utilization of incoming containers as warehouses facilitates the smooth and efficient transfer of goods between distribution, transportation, and customers while providing accurate and timely accountability of the disbursement of incoming inventory. A yard management system that accomplishes such a task provides better customer service, shortens the turn-around time for order fulfillment, lessens the square footage requirements for warehouse buildings, and substantially reduces docking requirements.

While minimizing costly problems that result from poor inventory accountability, a yard management system (one embodiment of which is disclosed herein) allows for the delivery of containerized goods to a third party consignee and provides for a sufficient degree of confidence in the accuracy of the goods received such that the consignee can readily accept the data directly into its inventory control and allocation processes.

Figure 23:
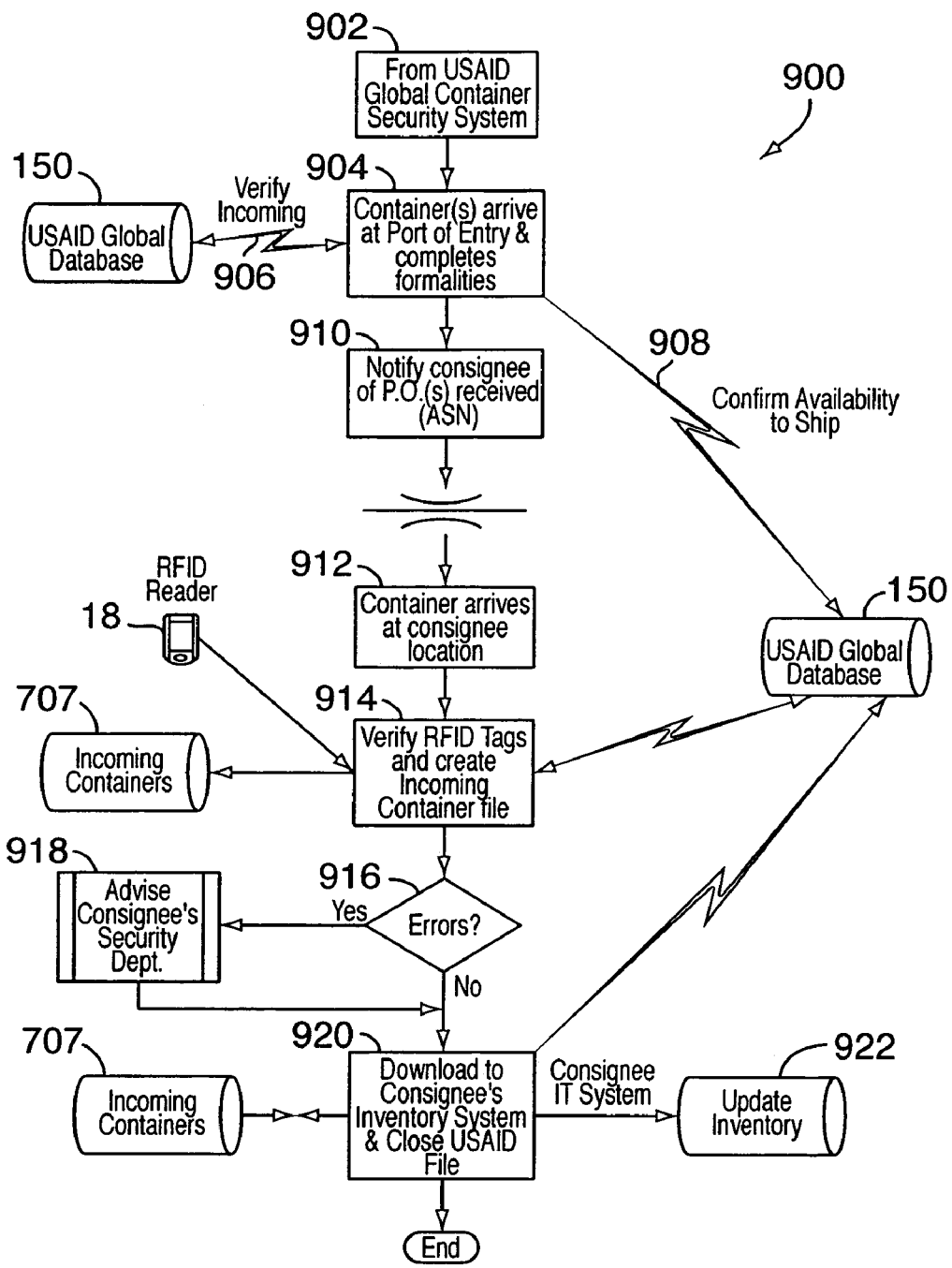
FIG. 23 is a flow diagram illustrating one embodiment of a yard management system.

Referring now to FIG. 23, one embodiment of an operation of a yard management system is shown at 900. Merchandise is shipped under the control of a system such as that described above in a shipping step 902. When the merchandise arrives at a port of entry (a seaport, airport or transportation depot) in a receiving step 904, various formalities are completed (e.g., Customs is cleared, the merchandise is containerized (if it has not been previously containerized), merchandise is tagged with RFID tags, and containers are secured with tamper-proof seals). The tags are scanned, and an aggregate signature indicative of the tags is obtained. The container contents are also then verified in a verification step 906 against the global database 150. Accordingly, most of the traditional problems related to being assured of the accuracy of shipping documentation have been eliminated. Under these circumstances a speedy turn-around of goods received by the consignee would be safer, faster, more efficient and less costly than possible before the use of RFID tagging systems. The availability of the goods to ship are confirmed in a confirmation step 908 by comparing the results of the verification step 906 against the global database 150.

Provided that the merchandise in the container(s) has no need for any special handling, storage, or packing requirements and further providing that the items are items that turn over in a relatively short amount of time (volatile), there is no reason to devote the time and effort necessary to unload the container and physically place the merchandise into a warehouse, only to pick and ship it again in a short time span. When receiving containers shipped under control of this or a similar system, a consignee can confidentially take the easier and more cost effective option of picking and shipping directly from the container which is parked in the yard, assigned a warehouse location ID, and treated in effect as a "mini-warehouse." Not only is this a more efficient use of resources but it also reduces the amount of investment needed for warehouse space and equipment while maintaining a superior degree of security over the goods.

In a notification step 910, the consignee is notified of the merchandise received. Preferably, the consignee is automatically notified of the availability of the relevant purchase order(s). If the receiving agent inputs the "delivery to consignee" data (carrier, date of shipment, anticipated date of delivery), this information is included in a Consignee Notification document. A security department under the control of the consignee is notified of any variances and advised that it will be responsible to investigate and resolve any outstanding security issues.

The consignee then accepts delivery of the merchandise at a designated location in a transfer step 912. RFID tags on the incoming containers 707 are read using a reader 18 to obtain another aggregate signature and to verify the container contents and to create an incoming container file in a verification step 914. A query 916 is made (e.g., the aggregate signatures are compared) to determine if any discrepancies or errors exist. If there are any errors, the consignee's security department is advised in an advisement step 918. If no errors have been detected, all pertinent information is downloaded to the consignee's inventory database in a download step 920. Data is received from the incoming containers 707, the inventory is updated in an update step 922, and files are accordingly closed.

In view of national security, there is not only a need for the monitoring of the shipment of goods, but also a need for the limited and generally non-intrusive monitoring of noncitizen visitors to, for example, a foreign country or territory to ensure that the visitors do not abuse their stay to the detriment of the host country. For example, there may be a need to be alerted of certain visitor initiated activity outside of the geographical area reported on an itinerary or schedule of the visitor. Moreover, there may also be a need to determine if the visitor has departed the foreign country or territory in accordance with the reported itinerary.

Figure 24:
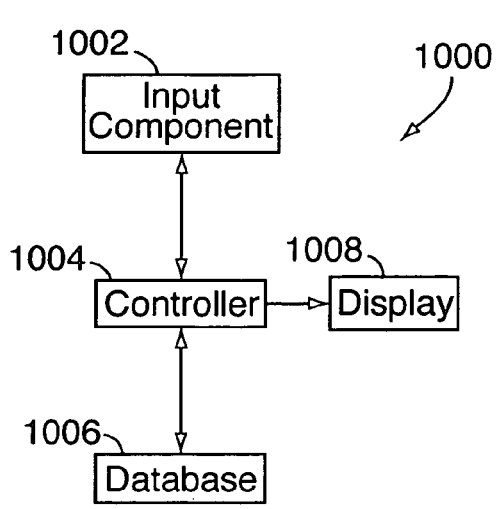
FIG. 24 is a schematic diagram of an electronic security system for the limited monitoring of visitors to a country or other territory in accordance with the present invention.

With reference to FIG. 24, an electronic security system for the limited monitoring of noncitizen visitors to a foreign country or other territory is indicated generally by the reference number 1000. The identification system 1000 includes an input component 1002, a controller 1004 bidirectionally communicating with the input component, a database 1006 bidirectionally communicating with the controller, and a display 1008 communicating with the controller for showing or otherwise indicating to security officials the visitor information.

The input component 1002 permits entering into the database 1006 of the system 1000 pertinent information about a noncitizen's visit to a foreign country or other territory. The pertinent information might include, for example, the length of stay, the general location(s) to be visited within the country, the return flight date, the return flight time, the airline, and the flight number. If the visitor is traveling by ship, the information might include, for example, the return date, the passenger ship departure time, the passenger line, and specific ship identification within the passenger line.

The pertinent information entered generally into the system 1000 via the input component 1002 is received by the controller 1004 and stored in the database 1006 for later retrieval and comparison with certain limited activity initiated by the visitor. The database 1006 may be, for example, a global database network of the types mentioned above with respect to the monitoring of cargo.

The input component 1002 and the controller 1004 each represent one or more such entities that communicate with the database 1006. For example, there may be several input components and associated controllers and displays dispersed throughout a country or territory at every port of entry such as an airport or port for docking passenger ships to enable officials at the port of entry to enter visitor information into the database 1006 when the visitor arrives. Moreover, the database 1006 may be representative of several databases which cooperate among each other in a network to keep track of noncitizen visitor information.

Figure 25:
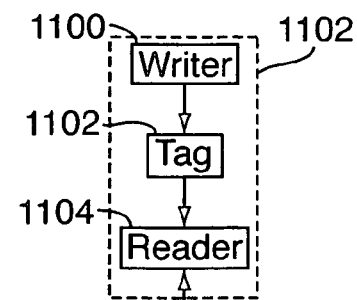
FIG. 25 is a schematic diagram showing in greater detail a first implementation of an input component of the electronic security system.

FIG. 25 illustrates one embodiment of the input component 1002 for permitting the entering of information pertaining to noncitizen visitors. The input component 1002 includes an electronic writer 1100 which communicates with an electronic tag 1102 such as an RFID card associated with the visitor. The RFID card may be embodied in, for example, a foreign visa, credit card, driver's license or other type of identity card to be carried by the visitor and presented to an official when entering a foreign country or territory. The electronic tag 1102 communicates with an electronic reader 1104 which receives the pertinent relevant visitor information to be received by the controller 1004 for storage in the database 1006. Alternatively, the input component 1002 may comprise only the reader 1104 for receiving information from, for example, a conventional credit/debit card.

Figure 26:
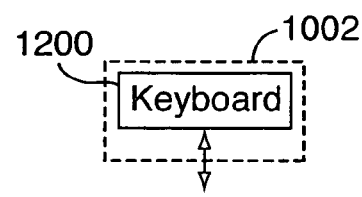
FIG. 26 is a schematic diagram showing in greater detail a second implementation of an input component of the electronic security system.

FIG. 26 illustrates another embodiment of the input component 1002 in accordance with the present invention. The input component 1002 includes a conventional keyboard 1200 for permitting the manual entering of pertinent information of the visitor to be received by the controller 1004 and stored in the database 1006.

Figure 27:
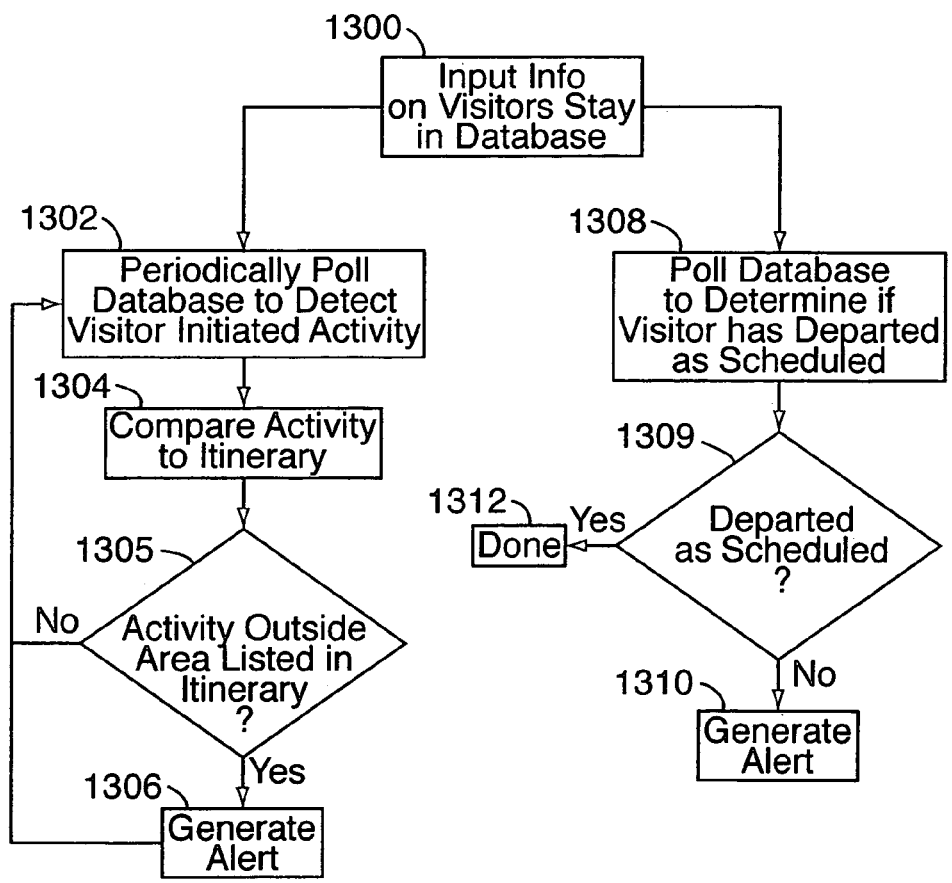
FIG. 27 is a flow diagram illustrating procedural steps for the limited monitoring of a visitor within a country or territory in accordance with the present invention.

FIG. 27 is a flow diagram illustrating an example of the limited monitoring of a visitor within a foreign country or territory. Upon visitor arrival in a foreign country or territory, a security official at a port of entry inputs pertinent information about a visitor's stay into a network database via an input component (step 1300). The input component might be a keyboard or include an electronic writer for also placing the information on an RFID card associated with and carried by the visitor. The information might include, for example, the length of stay, the general location(s) to be visited within the country, the return flight date, the return flight time, the airline, the flight number and credit/debit card information. If the visitor is traveling by ship, the information might include, for example, the return date, the passenger ship departure time, the passenger line, and specific ship identification within the passenger line.

Controllers in the network periodically poll the database for uploaded information to detect limited visitor initiated activity (step 1302). The activity is compared with the associated itinerary information stored in the database (step 1304). If activity by the visitor is detected in an area outside of the area listed in the visitor's itinerary (step 1305), a controller in the network sends an alert to a security official, for example, via a display (step 1306). The controllers in the network also poll the database when the visitor is scheduled to leave the foreign country or territory to determine if information has been uploaded to the database indicating that the visitor has left as scheduled (step 1308). If the polled information from the database indicates that the visitor has not left as scheduled (step 1309), a controller in the network sends an alert to a security official (step 1310). If the polled information from the database indicates that the visitor has left as scheduled, the monitoring of the visitor terminates (step 1312).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A security system for the limited monitoring of visitors to a country or territory, the system comprising:
   at least one input component configured for receiving information pertaining to a visitor's stay in a country or territory, the information including the scheduled departure of the visitor;
   at least one controller communicating with the at least one input component;
   at least one database communicating with the at least one controller for storing the information pertaining to the visitor's stay, the at least one controller configured for polling the at least one database to determine if the visitor has departed as scheduled, and for sending an alert if the visitor has not left as scheduled; and
   wherein the information further includes financial transaction information.

2. A security system as defined in claim 1, further comprising at least one display communicating with the at least one controller for showing the information.

3. A security system as defined in claim 1, wherein the at least one input component is a keyboard.

4. A security system as defined in claim 1, wherein the input component includes:
   an electronic writer;
   an electronic storage medium communicating with the electronic writer; and
   an electronic reader communicating with the electronic storage medium.

5. A security system as defined in claim 4, wherein the electronic storage medium includes an RFID tag.

6. A security system as defined in claim 1, wherein the input component includes an electronic reader.

7. A security system as defined in claim 1, wherein the at least one database includes a global database network.

8. A method for the limited monitoring of visitors to a country or territory, comprising the steps of:
   inputting into a database information pertaining to a visitor's stay including the scheduled departure of the visitor and financial transaction information;
   polling the database for information pertaining to actual departure of the visitor and ongoing financial transactions made by the visitor; and
   comparing the polled information with the information pertaining to scheduled departure to determine if the visitor departed as scheduled.

9. A method as defined in claim 8, further comprising the step of generating an alert if the visitor did not depart as scheduled.

10. A method as defined in claim 9, wherein the step of generating an alert includes sending a visual alert to a display.

11. A method as defined in claim 8, wherein:
    the step of inputting further includes entering into the database information pertaining to the general locations to be visited, and entering visitor initiated activity during the visitor's stay;
    the step of polling further includes periodically polling the database for information pertaining to visitor initiated activity; and
    the step of comparing further includes determining whether any visitor initiated activity is outside of the general locations to be visited.

12. A method as defined in claim 11, further comprising the step of generating an alert if the visitor initiated activity is outside of the general locations to be visited.

13. A method as defined in claim 12, wherein the step of generating an alert includes sending a visual alert to a display.

14. A method as defined in claim 11, wherein the visitor initiated activity includes scanning a credit/debit card of the visitor during a financial transaction.

15. A method as defined in claim 8, wherein the information pertaining to a visitor's stay further includes at least one of the following: length of stay, return date, return flight time, return flight airline, return flight airline number, passenger ship departure time, passenger line, and passenger ship identification within passenger line.

* * * * *